US008828606B2

(12) United States Patent
Morita et al.

(10) Patent No.: US 8,828,606 B2
(45) Date of Patent: Sep. 9, 2014

(54) POSITIVE ELECTRODE ACTIVE MATERIAL, POSITIVE ELECTRODE USING THE SAME AND NON-AQUEOUS ELECTROLYTE SECONDARY BATTERY

(75) Inventors: Koji Morita, Fukushima (JP); Satoshi Fujiki, Fukushima (JP); Hideki Nakai, Fukushima (JP)

(73) Assignee: Sony Corporation, Tokyo (JP)

( * ) Notice: Subject to any disclaimer, the term of this patent is extended or adjusted under 35 U.S.C. 154(b) by 835 days.

(21) Appl. No.: 12/507,510

(22) Filed: Jul. 22, 2009

(65) Prior Publication Data
US 2010/0028768 A1 Feb. 4, 2010

(30) Foreign Application Priority Data

Aug. 4, 2008 (JP) ................................. 2008-201306

(51) Int. Cl.
H01M 4/48 (2010.01)
H01M 4/131 (2010.01)
H01M 10/0525 (2010.01)
H01M 4/58 (2010.01)
H01M 4/485 (2010.01)
H01M 4/36 (2006.01)
H01M 4/134 (2010.01)
H01M 10/052 (2010.01)
H01M 2/16 (2006.01)
H01M 4/525 (2010.01)
H01M 4/1391 (2010.01)

(52) U.S. Cl.
CPC ............ H01M 4/525 (2013.01); H01M 4/5825 (2013.01); H01M 4/485 (2013.01); H01M 4/362 (2013.01); H01M 4/134 (2013.01); H01M 4/131 (2013.01); H01M 10/052 (2013.01); H01M 2/1653 (2013.01); Y02E 60/122 (2013.01)

USPC ................. 429/231.3; 429/231.95; 429/218.1

(58) Field of Classification Search
CPC .. H01M 4/13–4/1315; H01M 10/052–10/0525
USPC .......... 429/218.1, 223, 231.1, 231.3, 429/231.9–231.95
See application file for complete search history.

(56) References Cited

U.S. PATENT DOCUMENTS 5,962,167 A  10/1999  Nakai et al.
6,338,917 B1 * 1/2002  Maeda et al. ................. 429/223
(Continued)

FOREIGN PATENT DOCUMENTS

DE  19922522   11/2000
JP  05-036411   2/1993
(Continued)

OTHER PUBLICATIONS

European Search Report issued on Dec. 1, 2009.
(Continued)

Primary Examiner — Jonathan Crepeau
Assistant Examiner — Jacob Buchanan
(74) Attorney, Agent, or Firm — K&L Gates LLP

(57) ABSTRACT

A positive electrode active material includes: a complex oxide particle containing at least lithium and one or plural transition metals; and a coating layer provided in at least a part of the complex oxide particle, wherein the coating layer contains at least one element M which is different from the principal transition metal constituting the complex oxide particle and which is selected among elements belonging to the Groups 2 to 13, and at least one element X selected among phosphorus (P), silicon (Si) and germanium (Ge), and the element M and the element X show different distribution from each other in the coating layer.

22 Claims, 6 Drawing Sheets

(56) References Cited

U.S. PATENT DOCUMENTS

| | | |
|---|---|---|
| 6,653,021 B2 | 11/2003 | Kweon et al. |
| 6,984,469 B2 | 1/2006 | Kweon et al. |
| 7,135,251 B2 | 11/2006 | Cho et al. |
| 2002/0071991 A1* | 6/2002 | Kweon et al. ............... 429/231.1 |
| 2002/0076613 A1 | 6/2002 | Lee et al. |
| 2003/0113636 A1* | 6/2003 | Sano et al. .................... 429/330 |
| 2004/0053122 A1* | 3/2004 | Sugiyama et al. ............ 429/144 |
| 2005/0118511 A1 | 6/2005 | Park et al. |
| 2006/0093911 A1 | 5/2006 | Chiga et al. |
| 2007/0117024 A1* | 5/2007 | Nakai et al. ................... 429/246 |
| 2007/0224506 A1 | 9/2007 | Ooyama et al. |
| 2008/0248400 A1* | 10/2008 | Hwang et al. ................ 429/341 |

FOREIGN PATENT DOCUMENTS

| | | |
|---|---|---|
| JP | 07-235292 | 9/1995 |
| JP | 10-154532 | 6/1998 |
| JP | 10-241681 | 9/1998 |
| JP | 11-204145 | 7/1999 |
| JP | 3054829 | 4/2000 |
| JP | 2000-149950 | 5/2000 |
| JP | 2000-156227 | 6/2000 |
| JP | 2000-164214 | 6/2000 |
| JP | 2000-195517 | 7/2000 |
| JP | 3104682 | 9/2000 |
| JP | 3111791 | 11/2000 |
| JP | 3192855 | 5/2001 |
| JP | 2001-256979 | 9/2001 |
| JP | 3212639 | 9/2001 |
| JP | 2001-348224 | 12/2001 |
| JP | 2002-164053 | 6/2002 |
| JP | 2002-231227 | 8/2002 |
| JP | 3358478 | 10/2002 |
| JP | 2003-007299 | 1/2003 |
| JP | 2006-127932 | 5/2006 |
| JP | 4280436 | 6/2009 |
| WO | 2006-027925 | 3/2006 |
| WO | 2006/123572 | 11/2006 |

OTHER PUBLICATIONS

Japanese Patent Office, Notice of reasons for refusal, issued in connection with Japanese Patent Application No. 2008-201306, dated May 15, 2012. (5 pages).

* cited by examiner

POSITIVE ELECTRODE ACTIVE MATERIAL, POSITIVE ELECTRODE USING THE SAME AND NON-AQUEOUS ELECTROLYTE SECONDARY BATTERY

CROSS REFERENCES TO RELATED APPLICATIONS

The present application claims priority to Japanese Priority Patent Application JP 2008-201306 filed in the Japan Patent Office on Aug. 4, 2008, the entire contents of which is hereby incorporated by reference.

BACKGROUND

The present application relates to a positive electrode active material, a positive electrode using the same and a non-aqueous electrolyte secondary battery. For example, the present application relates to a positive electrode active material for non-aqueous electrolyte secondary battery containing a complex oxide containing lithium (Li) and a transition metal, a positive electrode using the same and a non-aqueous electrolyte secondary battery.

In recent years, techniques of portable electronic appliances have conspicuously developed, and electronic appliances such as mobile phones and laptop personal computers have started to be recognized as a fundamental technology for supporting the highly computerized society. Also, research and development regarding high functionalization of these electronic appliances are energetically advanced, and power consumption of these electronic appliances increases steadily in proportion thereto. On the other hand, these electronic appliances are required to be driven for a long period of time, and densification of high energy of a secondary battery which is a drive power source has been inevitably desired. Also, the prolongation of a cycle life has also been desired in view of environmental consideration.

From the viewpoints of occupied volume and mass of a battery to be built in an electronic appliance, it is desired that the energy density of the battery is as high as possible. At present, a lithium ion secondary battery is built in almost all of appliances because it has a high voltage and an excellent energy density as compared with other battery systems.

In general, the lithium ion secondary battery uses lithium cobaltate for a positive electrode and a carbon material for a negative electrode, respectively and is used at an operating voltage in the range of from 4.2 V to 2.5 V. In a unit cell, the fact that a terminal voltage can be increased to 4.2 V largely relies upon excellent electrochemical stability of a non-aqueous electrolyte material, a separator and so on.

For the purposes of realizing higher performances and enlarging applications of such a lithium ion secondary battery, a number of investigations have been advanced. As one of them, for example, it is investigated to increase the energy density of a positive electrode active material starting with lithium cobaltate by a method for increasing a charging voltage or the like, thereby contriving to attain a high capacity of the lithium ion secondary battery.

However, in the case of repeating charge and discharge at a high capacity, there is involved a problem that deterioration of the capacity is caused, whereby the battery life becomes short. Also, when used in a high-temperature environment, there is involved a problem that a gas is generated in the inside of the battery, resulting in causing liquid leakage, deformation of the battery, etc. Then, there has hitherto been employed a method for modifying a positive electrode active material by mixing a small amount of $LiMn_{1/3}Co_{1/3}Ni_{1/3}O_2$, etc. in the positive electrode active material and using the mixture or coating the surface of the positive electrode active material with other material.

For example, Japanese Patent No. 3172388 discloses a method for improving a cycle characteristic by coating a metal oxide on the surface of a positive electrode. Also, Japanese Patent No. 3691279 discloses a method for enhancing thermal stability by coating a metal oxide on the surface of a positive electrode active material.

Also, in coating the surface of a positive electrode active material, effects for improving a cycle characteristic and enhancing thermal stability by a coating form thereof are also investigated. For example, JP-A-7-235292, JP-A-2000-149950, JP-A-2000-156227, JP-A-2000-164214, JP-A-2000-195517 and JP-A-2002-231227 disclose a method for uniformly coating a lithium transition metal complex oxide. Also, JP-A-2001-256979 discloses a positive electrode active material having a lump of a metal oxide deposited on a metal oxide layer.

Also, elements to be used for surface coating are investigated. For example, JP-A-2002-164053 discloses a positive electrode active material having one or more surface treatment layers containing two or more coating elements on the surface of a lithium compound as a core.

JP-A-2003-7299 discloses a method for improving thermal stability by disposing a surface treatment layer containing a compound represented by $MXO_k$ on the surface of a particle. Also, JP-A-2006-127932 discloses a method for forming a surface layer containing a compound represented by $M_lP_mO_n$.

JP-A-05-36411 discloses a method for using a positive electrode having phosphorus (P) added thereto; and Japanese Patent No. 3054829 discloses a material in which the surface of a particle is coated with phosphorus (P). Also, Japanese Patent No. 3192855 discloses a method for forming a layer containing boron (B), phosphorus (P) or nitrogen (N).

Also, JP-A-10-154532, JP-A-10-241681 and JP-A-11-204145 disclose a method for containing a phosphoric acid salt compound, etc. in a positive electrode.

SUMMARY

However, in the coating element, coating method and coating form disclosed in the foregoing Japanese Patents Nos. 3172388 and 3691279, the diffusion of a lithium ion is inhibited, and therefore, there is involved a defect that a sufficient capacity is not obtained at a charge and discharge current value in a practically useful region.

According to the methods disclosed in the foregoing JP-A-7-235292, JP-A-2000-149950, JP-A-2000-156227, JP-A-2000-164214, JP-A-2000-195517 and JP-A-2002-231227, though the capacity can be kept high, it is still insufficient for enhancing the cycle characteristic at a high level and further suppressing the gas generation. Also, as a result of preparing a positive electrode active material having a structure in which a lump of a metal oxide is deposited on a metal oxide layer by the method disclosed in JP-A-2001-256979, a sufficient charge and discharge efficiency was not obtained, and the capacity was largely lowered.

In the foregoing JP-A-2002-164053, the distribution on the surface of a particle of a lithium compound as a core is not specified, and its effect is limited to an enhancement of thermal stability.

The foregoing JP-A-2003-7299 is concerned with an improvement of thermal stability by uniformly coating a compound represented by $MXO_k$ on the surface of a particle and diffusing. However, according to this method, the uniformly existing $MXO_k$ layer inhibits insertion and extraction of a lithium ion, and a sufficient charge and discharge characteristic is not obtained. Similarly, in the foregoing JP-A-2006-127932, a uniform surface layer is formed on the surface of a particle, and sufficient characteristics are not obtained.

The foregoing JP-A-05-36411 and Japanese Patents Nos. 3054829 and 3192855 are concerned with an enhancement of the cycle characteristic by adding or coating phosphorus on a positive electrode active material. However, according to these technologies using only a light element which is inert against lithium, a sufficient reversible capacity is not obtained.

The foregoing JP-A-10-154532 is concerned with a technology regarding safety at the time of overcharge, and in fact, when a phosphoric acid salt compound or the like is simply mixed in a positive electrode, a sufficient effect is not obtained. Similarly, even in the foregoing JP-A-10-241681 and JP-A-11-204145, since a phosphoric acid salt compound or the like is simply mixed in a positive electrode, the effect is insufficient.

As described previously, by modifying the positive electrode active material, though the cycle characteristic or thermal stability can be improved to some extent, the battery capacity is easily lowered. Also, the degree of improvement of battery characteristics obtained by the foregoing methods is not sufficient. Also, a more improvement regarding suppression of the gas generation in the inside of a battery as caused in a high-temperature environment is demanded.

Accordingly, it is desirable to provide a positive electrode active material having a high capacity and an excellent charge and discharge cycle characteristic and capable of suppressing the gas generation, a positive electrode using the same and a non-aqueous electrolyte secondary battery.

According to a first embodiment of the present application, there is provided a positive electrode active material including a complex oxide particle containing at least lithium and one or plural transition metals; and a coating layer provided in at least a part of the complex oxide particle, wherein the coating layer contains at least one element M which is different from the principal transition metal constituting the complex oxide particle and which is selected among elements belonging to the Groups 2 to 13, and at least one element X selected among phosphorus (P), silicon (Si) and germanium (Ge), and the element M and the element X show different distribution from each other in the coating layer.

According to a second embodiment of the present application, there is provided a positive electrode including a conductive substrate; and a positive electrode active material layer provided on the conductive substrate and containing at least a positive electrode active material, wherein the positive electrode active material includes a complex oxide particle containing at least lithium and one or plural transition metals; and a coating layer provided in at least a part of the complex oxide particle, and wherein the coating layer contains at least one element M which is different from the principal transition metal constituting the complex oxide particle and which is selected among elements belonging to the Groups 2 to 13, and at least one element X selected among phosphorus (P), silicon (Si) and germanium (Ge), and the element M and the element X show different distribution from each other in the coating layer.

According to a third embodiment of the present application, there is provided a non-aqueous electrolyte secondary battery including a positive electrode having a positive electrode active material, a negative electrode, a separator and an electrolyte, wherein the positive electrode active material includes a complex oxide particle containing at least lithium and one or plural transition metals; and a coating layer provided in at least a part of the complex oxide particle, and wherein the coating layer contains at least one element M which is different from the principal transition metal constituting the complex oxide particle and which is selected among elements belonging to the Groups 2 to 13, and at least one element X selected among phosphorus (P), silicon (Si) and germanium (Ge), and the element M and the element X show different distribution from each other in the coating layer.

In an embodiment, a coating layer containing at least one element M which is different from the principal transition metal constituting the complex oxide particle and which is selected among elements belonging to the Groups 2 to 13 and at least one element X selected among phosphorus (P), silicon (Si) and germanium (Ge) is provided, and the element M and the element X show different distribution from each other in the coating layer. Thus, high charge voltage properties and accompanying high energy density properties can be realized; and not only a good charge and discharge cycle characteristic can be revealed even at a high charge voltage, but the gas generation in the inside of a battery can be suppressed even in a high-temperature environment.

According to an embodiment, it is possible to realize a secondary battery which has a high capacity and an excellent charge and discharge cycle characteristic and which is low in the gas generation in the inside of a battery.

Additional features and advantages are described herein, and will be apparent from the following Detailed Description and the figures.

DETAILED DESCRIPTION

Figure 1:
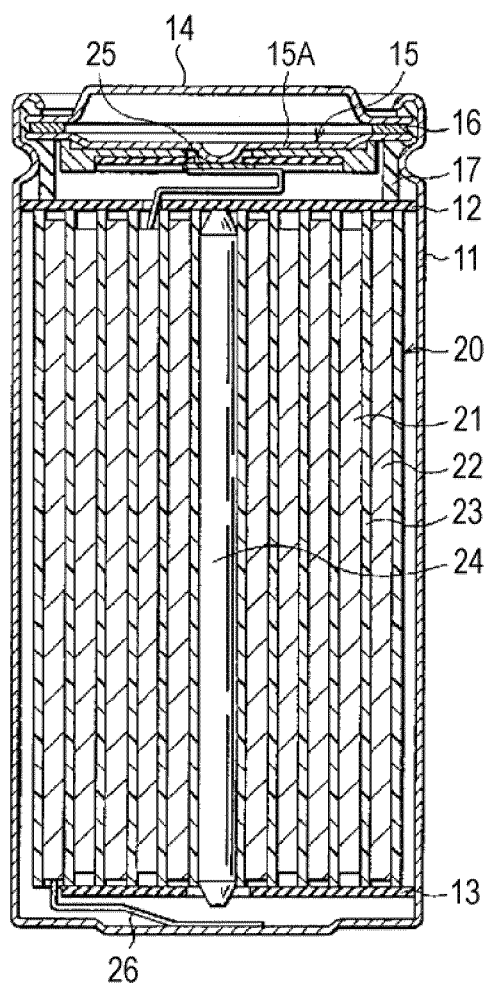
FIG. 1 is a sectional view showing a configuration of a battery according to Embodiment 1 of the present application.

The present application will be described below in greater detail with reference to the accompanying drawings according to an embodiment.

(1) Embodiment 1

(1-1) Positive Electrode Active Material

A positive electrode active material according to Embodiment 1 of the present application is provided with a coating layer containing, in at least a part of a complex oxide particle serving as a base material, at least one element M which is selected among elements belonging to the Groups 2 to 13 and which is different from a principal transition metal contained in the complex oxide particle and at least one element X selected among phosphorus (P), silicon (Si) and germanium (Ge), and the element M and the element X show different distribution from each other in the coating layer.

[Complex Oxide Particle]

The complex oxide particle serving as a base material is a lithium-containing transition metal oxide containing at least lithium and one or plural transition metals and is not particularly limited so far as it is able to intercalate and deintercalate lithium. However, lithium-containing transition metal oxides having a layered rock-salt type structure, for example, lithium cobaltate, lithium nickelate, a lithium-nickel-cobalt-manganese complex oxide, etc. are preferable. Of these, lithium-containing transition metal oxides composed mainly of lithium cobaltate are preferable because they have high filling properties and a high discharge voltage. The lithium-containing transition metal oxides composed mainly of lithium cobaltate may be one substituted with at least one element selected among elements belonging to the Groups 2 to 15 or one having been subjected to a fluorination treatment.

Specifically, it is preferred to use a lithium-containing transition metal oxide having a composition represented by the following chemical formula (1).

  (1)

$$Li_pCo_{(1-q)}T1_qO_{(2-y)}Q1_z \quad (1)$$

In the chemical formula (1), T1 represents at least one element selected among elements belonging to the Groups 2 to 15 other than cobalt (Co); Q1 represents at least one element selected among elements belonging to the Groups 16 and 17 other than oxygen (O); and p, q, y and z are values falling within the ranges of $0 \leq p \leq 1.2$, $0 \leq q < 0.3$, $-0.10 \leq y \leq 0.20$ and $0 \leq z \leq 0.1$, respectively.

Besides, lithium-containing transition metal oxides having a composition represented by each of the following chemical formulae (2) and (3) can also be used.

  (2)

$$Li_pNi_{(1-q-r)}Mn_qT2_rO_{(2-y)}Q2_z \quad (2)$$

In the chemical formula (2), T2 represents at least one element selected among elements belonging to the Groups 2 to 15 other than nickel (Ni) and manganese (Mn); Q2 represents at least one element selected among elements belonging to the Groups 16 and 17 other than oxygen (O); and p, q, r, y and z are values falling within the ranges of $0 \leq p \leq 1.5$, $0 \leq q \leq 1.0$, $0 \leq r \leq 1.0$, $-0.10 \leq y \leq 0.20$ and $0 \leq z \leq 0.2$, respectively.

  (3)

$$Li_wNi_xCo_yMn_zT3_{(1-x-y-z)}O_{(2-v)} \quad (3)$$

In the chemical formula (3), T3 represents at least one element selected from the group consisting of vanadium (V), copper (Cu), zirconium (Zr), zinc (Zn), magnesium (Mg), aluminum (Al), gallium (Ga), yttrium (Y) and iron (Fe); and v, w, x, y and z are values falling within the ranges of $-0.1 \leq v \leq 0.1$, $0.9 \leq w \leq 1.1$, $0 < x < 1$, $0 < y < 1$, $0 < z < 0.5$ and $0 \leq (1-x-y-z)$, respectively. The composition of lithium varies depending upon the state of charge and discharge; and the value of w represents a value in a completely discharged state.

Furthermore, a lithium complex oxide having a spinel type structure, which is represented by the following chemical formula (4), can also be used.

  (4)

$$Li_pMn_{2-q}T4_qO_rF_s \quad (4)$$

In the chemical formula (4), T4 represents at least one element selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Zn), calcium (Ca), strontium (Sr) and tungsten (W); and p, q, r and s are values falling within the ranges of $0.9 \leq p \leq 1.1$, $0 \leq q \leq 0.6$, $3.7 \leq r \leq 4.1$ and $0 \leq s \leq 0.1$, respectively. The composition of lithium varies depending upon the state of charge and discharge; and the value of p represents a value in a completely discharged state.

The principal transition metal constituting the complex oxide particle as referred to herein means a transition metal in the highest existing ratio among transition metals constituting the complex oxide particle. For example, in the case of a complex oxide particle having an average composition of $LiCo_{0.98}Al_{0.01}Mg_{0.01}O_2$, the principal transition metal shows cobalt (Co).

[Coating Layer]

The coating layer is provided in at least a part of the complex oxide particle and contains at least one element M which is different from the principal transition metal constituting the complex oxide particle contained in the complex oxide particle and which is selected among elements belonging to the Groups 2 to 13 and at least one element X selected among phosphorus (P), silicon (Si) and germanium (Ge).

The coating layer as referred to herein means a layer having a different composition element or composition ratio from the complex oxide particle and coating at least a part of the surface of the complex oxide particle. This coating layer is a layer formed when the element M and/or the element X is distributed on the surface of the complex oxide particle and is a region where a composition ratio of the element M and/or the element X in the coating layer is higher than a composition ratio of the element M and/or the element X in the complex oxide particle.

The coating layer according to Embodiment 1 of the present application differs from an existing coating layer with a simple configuration where distribution modes of plural elements contained in the coating layer are identical, and the element M and the element X contained in the coating layer show different distribution from each other in the coating layer. Specifically, the element M and the element X have a difference in uniformity of the distribution from each other, and it is preferable that the element M is more uniformly distributed on the surface of the complex oxide particle than the element X. Also, it is preferable that the element M is distributed on the surface of the complex oxide particle in a larger amount than the element X. Such a distribution mode of each of the element M and the element X can be, for example, confirmed by observing the complex oxide particle having the coating layer by a scanning electron microscope (SEM) provided with an energy dispersive X-ray (EDX) unit (this scanning electron microscope will be hereinafter referred to as "SEM/EDX"). Also, the distribution mode can be confirmed by analyzing the surface or section of the complex oxide particle by means of TOF-SIMS (time of flight secondary ion mass spectrometry), thereby measuring ions containing the elements M and X.

It is preferable that the element M is substantially uniformly distributed on the surface of the complex oxide particle to form the coating layer. This is because when the coating layer containing the element M is coated on the surface of the complex oxide particle, elution of the principal transition metal element contained in the complex oxide particle can be suppressed, or a reaction with an electrolytic solution can be suppressed, whereby deterioration of the characteristics can be suppressed.

Elements belonging to the Groups 2 to 13, which have hitherto been applied to substitution, addition, coating or the like relative to lithium cobaltate to be used for the positive electrode active material, can be used as such an element M.

Also, it is preferable that the element M includes at least manganese (Mn); and it is preferable that in the positive electrode active material provided with the complex oxide particle and the coating layer, an element composition of manganese (Mn) contained in the complex oxide particle and the element M contained in the coating layer is satisfied with a relation of $0<(Mn+M)/(Co+Mn+M)<0.1$. This is because though Mn contributes to stabilization of the active material, when its amount is 0.1 or more, a lowering in the volume of the active material itself becomes large. When the element M does not include nickel (Ni), a good gas generation suppressing effect is obtained, whereby it becomes possible to suppress expansion of the battery.

On the other hand, it is preferable that the element X is distributed such that it is interspersed on the surface of the complex oxide particle, thereby forming the coating layer. This is because inhibition of intercalation and deintercalation of lithium to be caused due to the coating layer containing the element X can be suppressed. The element X may be, for example, unevenly distributed on the surface of the complex oxide particle, or may be interspersed on plural points over the entire surface. Also, the element X may be distributed such that it is interspersed on the coating layer containing the element M.

It is preferable that the element X is interspersed on the surface in a state of a compound represented by $M'_aX_bO_c$ which is represented by, for example, $Li_3PO_4$. This is because when X which is used as a coating material exists as $M'_aX_bO_c$ on the surface of the complex oxide particle, the excessive element M' existing in the complex oxide particle is stabilized, whereby it becomes possible to contrive to enhance the battery characteristics. An excessive lithium (Li) compound, for example, lithium hydroxide (LiOH) and lithium carbonate ($Li_2CO_3$) causes the gas generation, resulting in deteriorating the battery characteristics. Thus, it may be considered that it is possible to contrive to enhance the battery characteristics by stabilizing it as $Li_3PO_4$. The compound represented by $Li_3PO_4$ is low in lithium ion conductivity, and when it is completely coated on the surface of the complex oxide particle, it disturbs intercalation and deintercalation of lithium. When the element X exists in a state that it is interspersed on the surface of the complex oxide particle as described previously, it is possible to make both high capacity and suppression of the gas generation compatible with each other. It is preferable that the compound represented by $M'_aX_bO_c$ is crystalline. This is because the interspersion onto the particle surface is promoted by crystallizing $M'_aX_bO_c$.

Also, the element M' is preferably an element which is different from the element M. This is because since the element M is an element which is preferably uniformly distributed on the surface of the oxide particle as far as possible, when it is interspersed together with the element X, the effect for enhancing the battery characteristics becomes small.

The element X is at least one element selected among phosphorus (P), silicon (Si) and germanium (Ge). These elements are an element which is hardly solid-soluble in the complex oxide particle, is able to be interspersed on the surface and is able to suppress the gas generation upon forming a stable compound together with lithium. Phosphorus (P), silicon (Si) and germanium (Ge) hardly form a compound together with the element M and are able to secure the function of the element M.

With respect to a portion of the element M and the element X which are contained relative to the whole amount of the complex oxide particle, it is preferable that the element M and the element X exist such that they are satisfied with a relation of $0<(M+X)/(Co+M+X)<0.25$. This is because when the element M and the element X do not exist, an enhancement in a cycle retention rate and a gas generation suppressing effect are not obtained, whereas when the proportion of the element M and the element X is 0.25 or more, a lowering of the volume of the active material becomes large, and an effect for enhancing the cycle characteristic is not obtained.

With respect to an element composition on the surface of the positive electrode active material as constituted above, it is preferable that the elements exist so as to have an element ratio which is satisfied with a relation of $Co/(M+X+Co)<0.7$. This is because when an existing proportion of Co is 0.7 or more, an effect for enhancing the cycle characteristic due to the coating layer containing the element M becomes small.

Here, the element ratio of Co, the element X and the element M on the surface of the positive electrode active material can be measured by using a scanning X-ray photoelectron spectroscope (ESCA: Quantera SXM, manufactured by Ulvac-Phi, Inc.). Specifically, the measurement can be carried out by embedding a particle sample to be measured in a metallic indium piece and fixing the sample piece onto a sample table with a leaf spring. The measurement can be carried out by using a monochromic Al—Kα ray (1,486.6 eV) as an X-ray source while charge correcting the surface of the sample to be measured in an automatic mode using an argon ion gun and an electron neutralizing gun.

An average particle size of the positive electrode active material is preferably in the range of 2.0 μm or more and not more than 50 μm. This is because when the average particle size of the positive electrode active material is less than 2.0 μm, in preparing a positive electrode, the positive electrode active material is easy to come off from a positive electrode collector in a pressing step, and the surface area of the positive electrode active material becomes large, and therefore, the addition amount of a conductive agent or a binder or the like must be increased, and an energy density per unit mass becomes small; whereas when the average particle size of the positive electrode active material exceeds 50 μm, the positive electrode active material penetrates through the separator, and a possibility of causing a short circuit becomes high.

By the use of the positive electrode active material according to Embodiment 1, not only a high capacity and an enhancement of the charge and discharge cycle characteristic of the secondary battery can be realized, but the gas generation in the inside of the battery can be suppressed. With respect to these effects, though their improvement behavior has not been elucidated yet, it may be estimated that they are caused due to the following mechanism.

It is possible to enhance the energy density of the secondary battery by using a complex oxide particle starting with, for example, lithium cobaltate ($LiCoO_2$) and lithium nickelate ($LiNiO_2$) and carrying out charge in a state of adequately designing a ratio of positive electrode and negative electrode such that an upper limit charge voltage is 4.20 V or more, preferably 4.35 V or more, and more preferably 4.40 V or more. However, in a battery charged at 4.20 V or more, since the positive electrode active material generates a high electromotive force, an electrolyte coming into contact with the positive electrode active material lies in a strong oxidation environment. According to this, it may be considered that the metal components elute from the positive electrode active material which has become instable in view of the fact that a larger amount of lithium (Li) is extracted, whereby the positive electrode active material is deteriorated; and that the metal components which have eluted from the positive electrode active material are reduced and deposited on the negative electrode side, whereby the surface of the negative electrode is covered, or intercalation and deintercalation of lithium are disturbed. Also, it may be considered that since the reactivity at an interface between the positive electrode active material and the electrolytic solution increases, oxidative degradation of the electrolytic solution at the interface is caused, whereby the deterioration of the electrolyte is accelerated. Also, it may be considered that in view of the fact that the electrolyte causes oxidative degradation on the positive electrode to generate a gas or form a film on the positive electrode, the battery expands, or impedance increases. In this way, it may be estimated that in view of the fact that deterioration of the positive electrode active material or the electrolytic solution is caused at the time of charge, the deterioration of the charge and discharge cycle characteristic or the gas generation in the inside of the battery is caused.

On the other hand, in the positive electrode active material according to Embodiment 1, it may be considered that since the coating layer containing the element M is provided on the surface of the complex oxide particle, the elution of the principal transition metal element contained in the complex oxide particle is suppressed, whereby the deterioration of the cycle characteristic is suppressed. Also, it may be considered that in view of the fact that the element X is contained in the coating layer, the element X reacts with impurities (for example, excessive lithium (Li) compounds inclusive of LiOH and $Li_2CO_3$) on the surface of the complex oxide particle, to stabilize the positive electrode active material, whereby the gas generation is suppressed; and that since the distribution of the element X in the coating layer is smaller than that of the element M so that intercalation and deintercalation of lithium are not disturbed, the element X contributes to achievement of both a high capacity and an enhancement of the cycle characteristic.

(1-2) Configuration of Secondary Battery

FIG. 1 shows a sectional structure of a battery according to Embodiment 1. This battery is, for example, a non-aqueous electrolyte secondary battery and is a so-called lithium ion secondary battery using lithium (Li) as an electrode reactant, in which the capacity of a negative electrode is expressed by a capacity component due to intercalation and deintercalation of lithium (Li).

This battery is of a so-called cylinder type and has a wound electrode body 20 in which a pair of a strip-shaped positive electrode 21 and a strip-shaped negative electrode 22 is wound via a separator 23 in the inside of a substantially hollow columnar battery can 11. The battery can 11 is made of, for example, nickel (Ni)-plated iron (Fe), and one end thereof is closed, with the other end being opened. A pair of insulating plates 12 and 13 is disposed in the inside of the battery can 11 vertically against the wound peripheral surface so as to interpose the wound electrode body 20 therebetween.

In the open end of the battery can 11, a battery lid 14 is installed by caulking with a safety valve mechanism 15 and a positive temperature coefficient element (PTC element) 16 provided in the inside of this battery lid 14 via a gasket 17, and the inside of the battery can 11 is hermetically sealed.

The battery lid 14 is made of, for example, the same material as in the battery can 11. The safety valve mechanism 15 is electrically connected to the battery lid 14 via the positive temperature coefficient element 16, and in the case where the pressure in the inside of the battery becomes a fixed value or more due to an internal short circuit or heating from the outside or the like, a disc plate 15A is reversed, whereby electrical connection between the battery lid 14 and the wound electrode body 20 is disconnected. When the temperature rises, the positive temperature coefficient element 16 controls a current due to an increase of a resistance value, thereby preventing abnormal heat generation to be caused due to a large current. The gasket 17 is made of, for example, an insulating material, and asphalt is coated on the surface thereof.

For example, a center pin 24 is inserted in the center of the wound electrode body 20. A positive electrode lead 25 made of aluminum (Al), etc. is connected to the positive electrode 21 of the wound electrode body 20; and a negative electrode lead 26 made of nickel (Ni), etc. is connected to the negative electrode 22. The positive electrode lead 25 is welded to the safety valve mechanism 15, whereby it is electrically connected to the battery lid 14; and the negative electrode lead 26 is welded to the battery can 11, whereby it is electrically connected thereto.

[Positive Electrode]

Figure 2:
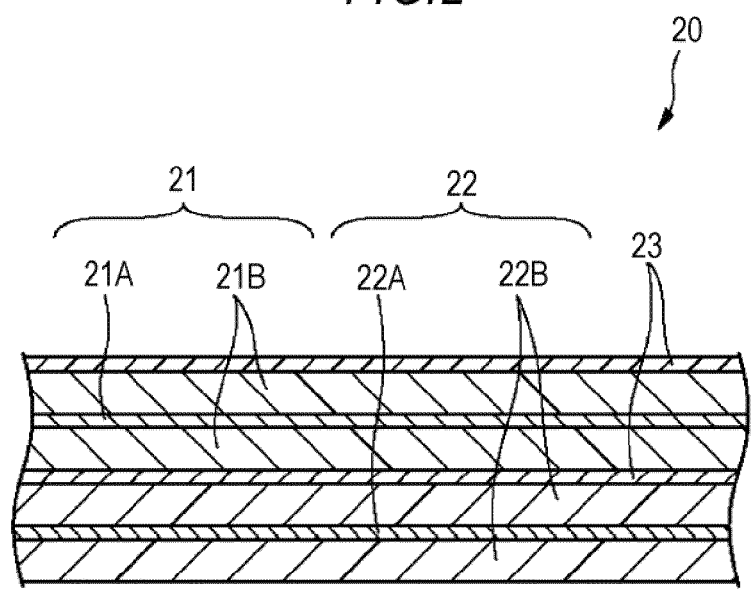
FIG. 2 is a sectional view showing enlargedly a part of a wound electrode body in the battery shown in FIG. 1.

FIG. 2 is a sectional view showing enlargedly a part of the wound electrode body 20 shown in FIG. 1. The positive electrode 21 has, for example, a structure in which a positive electrode active material layer 21B is provided on the both surfaces of a positive electrode collector 21A having a pair of opposing surfaces to each other. Though illustration is omitted, a region where the positive electrode active material layer 21B exists may be provided on only one surface of the positive electrode collector 21A. The positive electrode collector 21A is made of a metal foil, for example, an aluminum foil, etc. The positive electrode active material layer 21B contains, for example, the positive electrode active material according to the foregoing Embodiment 1 and is constituted to include a conductive agent such as carbon black and graphite and a binder such as polyvinylidene fluoride as the need arises.

[Negative Electrode]

As shown in FIG. 2, the negative electrode 22 has a negative electrode collector 22A having a pair of opposing surfaces to each other and a negative electrode active material layer 22B provided on the both surfaces or one surface of the electrode collector 22A. The negative electrode 22 may be configured to have a region where the negative electrode active material layer 22B is provided on only one surface of the negative electrode collector 22A. The negative electrode collector 22A is made of a metal foil, for example, a copper (Cu) foil, etc.

The negative electrode active material layer 22B contains, for example, a negative electrode active material and may contain other material which does not contribute to the charge, for example, a conductive agent, a binder, a viscosity modifier, etc. as the need arises. Examples of the conductive agent include graphite fibers, metal fibers and metal powders. Examples of the binder include fluorine based polymer compounds such as polyvinylidene fluoride; and synthetic rubbers such as styrene-butadiene rubbers and ethylene-propylene-diene rubbers. Examples of the viscosity modifier include carboxymethyl cellulose.

The negative electrode active material is constituted to include any one kind or two or more kinds of negative electrode materials capable of electrochemically intercalating and deintercalating lithium (Li) at a potential of not more than 2.0 V against the lithium metal.

Examples of the negative electrode material capable of intercalating and deintercalating lithium (Li) include carbon materials, metal compounds, oxides, sulfides, lithium nitrides such as $LiN_3$, a lithium metal, metals capable of forming an alloy together with lithium and polymer materials.

Examples of the carbon material include hardly graphitized carbon, easily graphitized carbon, graphite, pyrolytic carbons, cokes, vitreous carbons, organic polymer compound baked materials, carbon fibers and active carbon. Of these, examples of the cokes include pitch coke, needle coke and petroleum coke. The organic polymer compound baked material as referred to herein refers to a material obtained through carbonization by baking a polymer material such as phenol resins and furan resins at an appropriate temperature, and a part thereof is classified into hardly graphitized carbon or easily graphitized carbon. Also, examples of the polymer material include polyacetylene and polypyrrole.

Of these negative electrode materials capable of intercalating and deintercalating lithium (Li), those having a charge and discharge potential relatively close to a lithium metal are preferable. This is because the lower the charge and discharge potential of the negative electrode 22, the easier the attainment of a high energy density of the battery. Above all, the carbon material is preferable because a change in the crystal structure to be generated at the time of charge and discharge is very small, a high charge and discharge capacity can be obtained, and a good cycle characteristic can be obtained. In particular, graphite is preferable because its electrochemical equivalent is large, and a high energy density can be obtained. Also, hardly graphitized carbon is preferable because an excellent cycle characteristic can be obtained.

Also, examples of the negative electrode material capable of intercalating and deintercalating lithium (Li) include a lithium metal single body and a single body, an alloy or a compound of a metal element or a semi-metal element capable of forming an alloy together with lithium (Li). These materials are preferable because a high energy density can be obtained. In particular, the joint use of such a material with the carbon material is more preferable because not only a high energy density can be obtained, but an excellent cycle characteristic can be obtained. In this specification, the alloy includes alloys containing at least one kind of a metal element and at least one kind of a semi-metal element in addition to alloys composed of two or more kinds of metal elements. Examples of its texture include a solid solution, a eutectic (eutectic mixture), an intermetallic compound and one in which two or more kinds thereof coexist.

Examples of such a metal element or semi-metal element include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf). Examples of such an alloy or compound include those represented by a chemical formula: $Ma_sMb_tLi_u$ or a chemical formula: $Ma_pMc_qMd_r$. In these chemical formulae, Ma represents at least one member of metal elements and semi-metal elements capable of forming an alloy together with lithium; Mb represents at least one member of metal elements and semi-metal elements other than lithium and Ma; Mc represents at least one member of non-metal elements; and Md represents at least one member of metal elements and semi-metal elements other than Ma. Also, the values of s, t, u, p, q and r are s>0, t≥0, u≥0, p>0, q>0 and r≥0, respectively.

Above all, a single body, an alloy or a compound of a metal element or a semi-metal element belonging to the Group 4B of the short form of the periodic table is preferable; and silicon (Si) or tin (Sn) or an alloy or a compound thereof is especially preferable. These materials may be crystalline or amorphous.

Furthermore, examples of the negative electrode material capable of intercalating and deintercalating lithium include oxides, sulfides and other metal compounds inclusive of lithium nitrides such as $LiN_3$. Examples of the oxide and the sulfides include $MnO_2$, $V_2O_5$, $V_6O_{13}$, NiS and MoS. Besides, examples of oxides having a relatively base potential and capable of intercalating and deintercalating lithium include iron oxide, ruthenium oxide, molybdenum oxide, tungsten oxide, titanium oxide and tin oxide. Examples of sulfides include NiS and MoS.

[Electrolytic Solution]

A non-aqueous electrolytic solution having an electrolyte salt dissolved in a non-aqueous solvent can be used as the electrolytic solution. Examples of the non-aqueous solvent include various high dielectric solvents and low viscosity solvents, and those which have been used in existing non-aqueous electrolyte secondary batteries can be utilized.

Examples of the high dielectric solvent which can be suitably used include ethylene carbonate and propylene carbonate. However, it should not be construed that the high dielectric solvent is limited thereto, and cyclic carbonates such as butylene carbonate, vinylene carbonate, 4-fluoro-1,3-dioxolan-2-one (fluoroethylene carbonate), 4-chloro-1,3-dioxolan-2-one (chloroethylene carbonate) and trifluoromethyl ethylene carbonate can be used.

Also, a lactone such as γ-butyrolactone and γ-valerolactone, a lactam such as N-methylpyrrolidone, a cyclic carbamic acid ester such as N-methyloxazolidinone, a sulfone compound such as tetramethylene sulfone, or the like can be used as the high dielectric solvent in place of or together with the cyclic carbonate.

On the other hand, diethyl carbonate can be suitably used as the low viscosity solvent. Besides, chain carbonates such as dimethyl carbonate, ethylmethyl carbonate and methylpropyl carbonate; chain carboxylic acid esters such as methyl acetate, ethyl acetate, methyl propionate, ethyl propionate, methyl lactate, methyl isolactate, methyl trimethylacetate and ethyl trimethylacetate; chain amides such as N,N-dimethylacetamide; chain carbamic acid esters such as methyl N,N-diethylcarbamate and ethyl N,N-diethylcarbamate; and ethers such as 1,2-dimethoxyethane, tetrahydrofuran, tetrahydropyran and 1,3-dioxolane can be used.

The foregoing high dielectric solvent and low viscosity solvent can be used as the solvent singly or as an arbitrary mixture of two or more kinds thereof. A mixture containing from 20 to 50% of a cyclic carbonate and from 50 to 80% of a low viscosity solvent (low viscosity non-aqueous solvent) is preferable, and in particular, one in which the low viscosity solvent is a chain carbonate having a boiling point of not higher than 130° C. is desirable. When the ratio of the cyclic carbonate and the low viscosity solvent falls outside the foregoing range, for example, in the case where the proportion of the low viscosity solvent is too high, the dielectric constant becomes low; whereas in the case where the proportion of the low viscosity solvent is too low, the viscosity becomes low. In all of these cases, there is a concern that a sufficient conductivity is not obtained, and good battery characteristics are not obtained.

The electrolyte salt includes one which is dissolved or dispersed in the foregoing non-aqueous solvent to generate an ion, and examples thereof include lithium salts.

Examples of the lithium salt include inorganic lithium salts such as lithium hexafluorophosphate ($LiPF_6$), lithium tetrafluoroborate ($LiBF_4$), lithium hexaarsenate ($LiAsF_6$), lithium hexaantimonate ($LiSbF_6$), lithium perchlorate ($LiClO_4$) and lithium tetrachloroaluminate ($LiAlCl_4$); and perfluoroalkanesulfonic acid derivatives such as lithium trifluoromethanesulfonate ($LiCF_3SO_3$), lithium bis(trifluoromethanesulfone)imide ($LiN(CF_3SO_2)_2$), lithium bis(pentafluoromethanesulfone)methide ($LiN(C_2F_5SO_2)_2$) and lithium tris(trifluoromethanesulfone)methide ($LiC(CF_3SO_2)_3$). These compounds can be used singly or in combinations of two or more kinds thereof. Of these, lithium hexafluorophosphate ($LiPF_6$) is preferable because not only high ionic conductivity can be obtained, but the cycle characteristic can be enhanced.

The content of such an electrolyte salt is preferably in the range of from 0.1 moles to 3.0 moles, and more preferably in the range of from 0.5 moles to 2.0 moles per liter (L) of the solvent. This is because higher ionic conductivity can be obtained within this range.

[Separator]

The separator 23 partitions the positive electrode 21 and the negative electrode 22 from each other and allows a lithium ion to pass therethrough while preventing a short circuit of the current to be caused due to the contact of the both electrodes.

As the separator 23, those which have been used in existing batteries and which are constituted of a microporous film made of a synthetic resin such as polytetrafluoroethylene (PTFE), polypropylene (PP) and polyethylene (PE), or a microporous film made of a ceramic; and those having a structure in which polyvinylidene fluoride (PVdF) or polytetrafluoroethylene (PTFE) is coated on the foregoing microporous film to form a porous resin layer on the surface thereof can be used. Of these, the separator 23 having a structure in which a porous resin layer is formed on the surface thereof is preferable because an excellent cycle characteristic can be obtained even at a high charge voltage.

Figure 3:
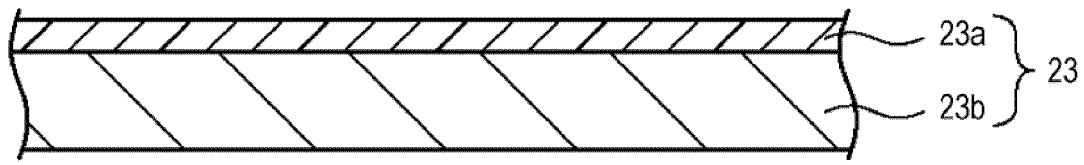
FIG. 3 is an enlarged sectional view showing one example of a separator according to Embodiment 1 of the present application.

One example and other example of the structure of the separator 23 in which a porous resin layer is formed on a microporous film are hereunder described with reference to FIGS. 3 and 4. FIG. 3 is an enlarged sectional view showing one example of the structure of such a separator 23. As shown in FIG. 3, the separator 23 has a structure in which a resin layer 23a is provided on one principal surface of a substrate layer 23b. As a material of the substrate layer 23b, those which have been used in existing batteries, for example, the foregoing microporous films can be utilized. For example, a microporous film containing at least one member selected among polyethylene, polypropylene, copolymers thereof and polyolefins obtained by combining these polymers can be utilized. Above all, it is especially preferred to use a polyolefin-made microporous film having an excellent short-circuit preventing effect and capable of enhancing safety of the battery due to a shutdown effect. Specifically, a microporous film made of a polyethylene or polypropylene resin is preferable.

Though the substrate layer 23b shown in FIG. 3 has a single-layered structure, the substrate layer 23b may have a multilayered structure. More specifically, for example, a microporous film having a three-layered structure obtained by laminating a polypropylene (PP) layer, a polyethylene (PE) layer and a polypropylene (PP) layer in success or the like can be used as the substrate layer having a multilayered structure. The use of, as the substrate layer 23b, a microporous film composed of a mixture of polyethylene and polypropylene or a microporous film having a three-layered structure obtained by laminating a polypropylene (PP) layer, a polyethylene (PE) layer and a PP layer in success is preferable because it is easy to allow the separator 23 to satisfy both adequate air permeability and strength as described later.

The resin layer 23a is a matrix resin layer which is rich in porosity. By providing the matrix resin layer, the direct contact between the electrode and the substrate layer 23b of the separator 23 is prevented. Accordingly, deterioration of the substrate layer 23b to be caused due to an oxidation-reduction reaction, such as carbonization and clogging, can be suppressed, whereby deterioration of the battery characteristics can be suppressed.

Specific examples of the matrix resin which can be used include polyvinylidene fluoride (PVdF), vinylidene fluoride-hexafluropropylene copolymer and polytetrafluoroethylene (PTFE). Also, copolymers of these materials can be used.

A material having an inorganic material carried on a matrix resin layer may also be used as the resin layer 23a. By providing the resin layer 23a having an inorganic material carried on a matrix resin, the oxidation resistance can be further enhanced, and deterioration of the separator 23 can be suppressed.

Examples of the inorganic material include metals, semiconductors and oxides or nitrides thereof. Specific examples of the metal which can be used include aluminum (Al) and titanium (Ti); and specific examples of the semiconductor which can be used include silicon (Si) and boron (B). Also, specific examples of the oxide or nitride which can be used include alumina ($Al_2O_3$), boron nitride (BN), aluminum nitride (AlN), titanium dioxide ($TiO_2$) and silicon dioxide ($SiO_2$).

A particle size of the inorganic material is preferably in the range of from 1 nm to 10 μm. This is because when the particle size of the inorganic material is smaller than 1 nm, such inorganic materials are hardly available, and even if they are available, such is not cost-effective; whereas when the particle size of the inorganic material is larger than 10 μm, a distance between the electrodes is large, the filling amount of the active material is not obtained in a limited space, and the battery capacity becomes low.

With respect to a method for forming the resin layer 23a, for example, the resin layer 23a can be formed by coating a slurry composed of a matrix resin, a solvent and an inorganic material on the substrate layer 23b, allowing the coated substrate layer 23b to pass through a poor solvent of the matrix resin and a bath compatible with the foregoing solvent, thereby causing phase separation and then drying it.

A piercing strength of such a separator 23 is preferably in the range of from 100 gf to 1,000 gf. This is because when the piercing strength is too low, a short circuit may be possibly caused, whereas when it is too high, the ionic conductivity is lowered. The piercing strength is determined by using a handy-type compression tester (KES-G5, manufactured by Kato Tech Co., Ltd.) and measuring a maximum load when the separator 23 is pierced with a needle having a tip diameter φ of 1.0 mm at a rate of 2 mm/sec.

Also, an air permeability of the separator 23 is preferably in the range of from 30 sec/100 cc to 1,000 sec/100 cc, more preferably in the range of from 50 sec/100 cc to 600 sec/100 cc, and further preferably in the range of from 100 sec/100 cc to 400 sec/100 cc. This is because when the air permeability is too low, a short circuit may be possibly caused, whereas when it is too high, the ionic conductivity is lowered. By making the thickness of the substrate layer 23b or the resin layer 23a thin, it is possible to lower the air permeability, thereby enabling one to contribute to an increase of the battery capacity. However, in general, a lowering of the piercing strength of the separator 23 is easily caused. The air permeability is measured in conformity with JIS P8117 and expresses the number of second at which 100 cc of air permeates through the film under a pressure of 1.22 kPa.

A thickness of the substrate layer 23b is preferably in the range of, for example, 5 μm or more and not more than 15 μm. This is because when the thickness of the substrate layer 23b is too thin, a short circuit is easily caused, whereas when the thickness of the substrate layer 23b is too thick, not only the ionic conductivity is lowered, but the volume capacity is lowered.

A thickness of the resin layer 23a is preferably in the range of 0.2 μm or more and not more than 10 μm. This is because when the thickness of the resin layer 23a is too thin, a short circuit is easily caused, whereas when the thickness of the resin layer 23a is too thick, not only the ionic conductivity is lowered, but the volume capacity is lowered.

A weight per unit area of the resin layer 23a to be formed (the weight per unit area will be hereinafter properly referred to as "surface density") is preferably from 0.05 mg/cm$^2$ to 0.5 mg/cm$^2$, and more preferably from 0.1 mg/cm$^2$ to 0.3 mg/cm$^2$ per one surface. This is because when the surface density of the resin layer 23a is too low, a gel electrolyte layer between the electrode and the separator is insufficient, whereby an enhancement of the oxidation resistance is insufficient, whereas when the surface density of the resin layer 23a is too high, the ionic conductivity is lowered.

Figure 4:
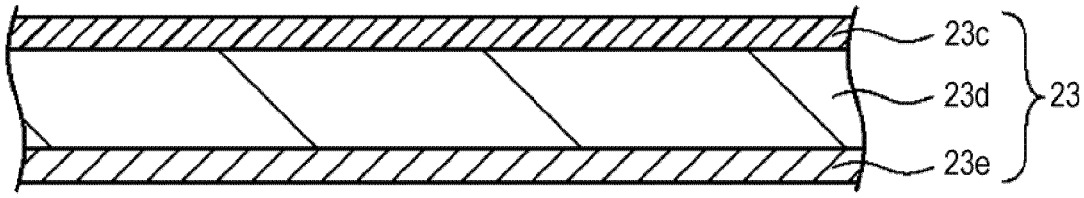
FIG. 4 is an enlarged sectional view showing other example of a separator according to Embodiment 1 of the present application.

FIG. 4 is an enlarged sectional view showing other example of the structure of the separator 23. As shown in FIG. 4, the separator 23 has a structure in which a resin layer 23c and a resin layer 23e are provided on the both surfaces of a substrate layer 23d, respectively. The resin layer 23c and the resin layer 23e may be made of a different material from each other. The configuration other than the structure of the separator 23 is identical with that in one example as explained with reference to FIG. 3, and therefore, its detailed explanation is omitted.

An electrolytic solution which is a liquid electrolyte is impregnated in the separator 23.

An upper limit charge voltage of this secondary battery may be, for example, 4.20 V. However, this secondary battery is preferably designed such that the upper limit charge voltage is higher than 4.20 V and falls within the range of 4.25 V or more and not more than 4.80 V and is more preferably designed such that the upper limit charge voltage falls within the range of 4.35 V or more and not more than 4.65 V. Also, a lower limit discharge voltage is preferably 2.00 V or more and not more than 3.30 V. By increasing the battery voltage, the energy density can be increased. Also, according to Embodiment 1, since the coating layer where the distribution mode is different between the element M and the element X is formed, even when the battery voltage is increased, an excellent cycle characteristic is obtained, and the gas generation in the inside of the battery can be suppressed.

(1-3) Manufacturing Method of Secondary Battery

Next, one example of a method for manufacturing a secondary battery according to Embodiment 1 is described.

The positive electrode active material is prepared in the following manner. For example, the positive electrode active material can be prepared by using, as the complex oxide particle serving as a base material, a lithium-containing transition metal oxide which is in general available as a positive electrode active material, as a starting raw material and pulverizing and mixing this complex oxide particle and a compound containing the element M and the element X to be coated thereon, thereby allowing the element M and the element X to adhere onto the surface of the complex oxide particle. With respect to an adhesion measure, the adhesion can be carried out by using, for example, a ball mill, a jet mill, an attritor, a pulverizer, etc. In that case, it is effective to carry out the adhesion by adding a slight amount of a liquid component which can be exemplified by water. Also, it is possible to allow the element M and the element X to adhere onto the surface of the complex oxide particle by a mechanochemical treatment such as mechanofusion, a sputtering process or a vapor deposition process such as a chemical vapor deposition (CVD) process. Furthermore, the adhesion of the element M and the element X can be carried out by a wet process such as a process for mixing raw materials in water or a solvent such as ethanol, a neutralization titration process and a sol-gel process using a metal alkoxide as a raw material.

Also, a material obtained by allowing the element M and the element X to adhere onto the surface of the complex oxide particle may be baked at a temperature of, for example, 300° C. or higher and not higher than 1,000° C. in an oxidative atmosphere such as air and pure oxygen. Also, after baking, the particle size control may be carried out by means of light pulverization, classification, etc. as the need arises. Furthermore, different coating layers may be formed by carrying out the coating treatment two times or more. The distribution of each of the element M and the element X in the coating layer varies depending upon reactivity between the complex oxide particle and the element M or the element X, a state of a starting raw material of the element M or the element X, an adhesion process onto the surface of the complex oxide particle, a heat treatment condition after adhesion, etc. Accordingly, it is possible to make the distribution of each of the element M and the element X identical with or different from each other by varying reactivity between the complex oxide particle and the element M or the element X, a state of a starting raw material of the element M or the element X an adhesion process onto the surface of the complex oxide particle, a heat treatment condition after adhesion, etc.

The positive electrode 21 is prepared in the following manner. First of all, for example, a positive electrode active material, a conductive agent and a binder are mixed to prepare a positive electrode mixture, and this positive electrode mixture is dispersed in a solvent, for example, 1-methyl-2-pyrrolidone, etc. to prepare a positive electrode mixture slurry. Subsequently, this positive electrode mixture slurry is coated on the positive electrode collector 21A; the solvent is dried, and the resulting positive electrode collector 21A is then subjected to compression molding by a roll press, etc. to form the positive electrode active material layer 21B. There is thus obtained the positive electrode 21.

The negative electrode 22 is prepared in the following manner. First of all, for example, a negative electrode active material and a binder are mixed to prepare a negative electrode mixture, and this negative electrode mixture is dispersed in a solvent, for example, 1-methyl-2-pyrrolidone, etc. to prepare a negative electrode mixture slurry. Subsequently, this negative electrode mixture slurry is coated on the negative electrode collector 22A; the solvent is dried; and the resulting negative electrode collector 22A is then subjected to compression molding by a roll press, etc. to form the negative electrode active material layer 22B. There is thus obtained the negative electrode 22.

Subsequently, the positive electrode lead 25 is installed in the positive electrode collector 21A by means of welding, etc.; and the negative electrode lead 26 is also installed in the negative electrode collector 22A by means of welding, etc. Thereafter, the positive electrode 21 and the negative electrode 22 are wound via the separator 23; a tip of the positive electrode lead 25 is welded to the safety valve mechanism 15; a tip of the negative electrode lead 26 is also welded to the battery can 11; and the wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, an electrolyte is injected into the inside of the battery can 11 and impregnated in the separator 23. Thereafter, the battery lid 14, the safety valve mechanism 15 and the temperature coefficient element 16 are fixed to the open end of the battery can 11 via the gasket 17 by caulking. There is thus prepared the secondary battery as shown in FIG. 1.

In this secondary battery, when charge is carried out, for example, a lithium ion is deintercalated from the positive electrode active material layer 21B and intercalated into the negative electrode active material layer 22B via the electrolytic solution. Also, when discharge is carried out, for example, a lithium ion is deintercalated from the negative electrode active material layer 22B and intercalated into the positive electrode active material layer 21B via the electrolytic solution.

As described previously, in Embodiment 1, the coating layer containing the element M and the element X on the surface of the complex oxide particle is provided, and M and X in this coating layer show different distribution from each other. Thus, not only a high capacity and an enhancement of the charge and discharge cycle characteristic of the secondary battery can be realized, but the gas generation in the inside of the battery can be suppressed. The secondary battery according to Embodiment 1 has characteristics of light weight, high capacity and high energy density and can be widely utilized for potable small-sized electronic appliances, for example, video cameras, laptop personal computers, word processors, radio cassette recorders, mobile phones, etc.

(2) Embodiment 2

(2-1) Configuration of Secondary Battery

Figure 5:
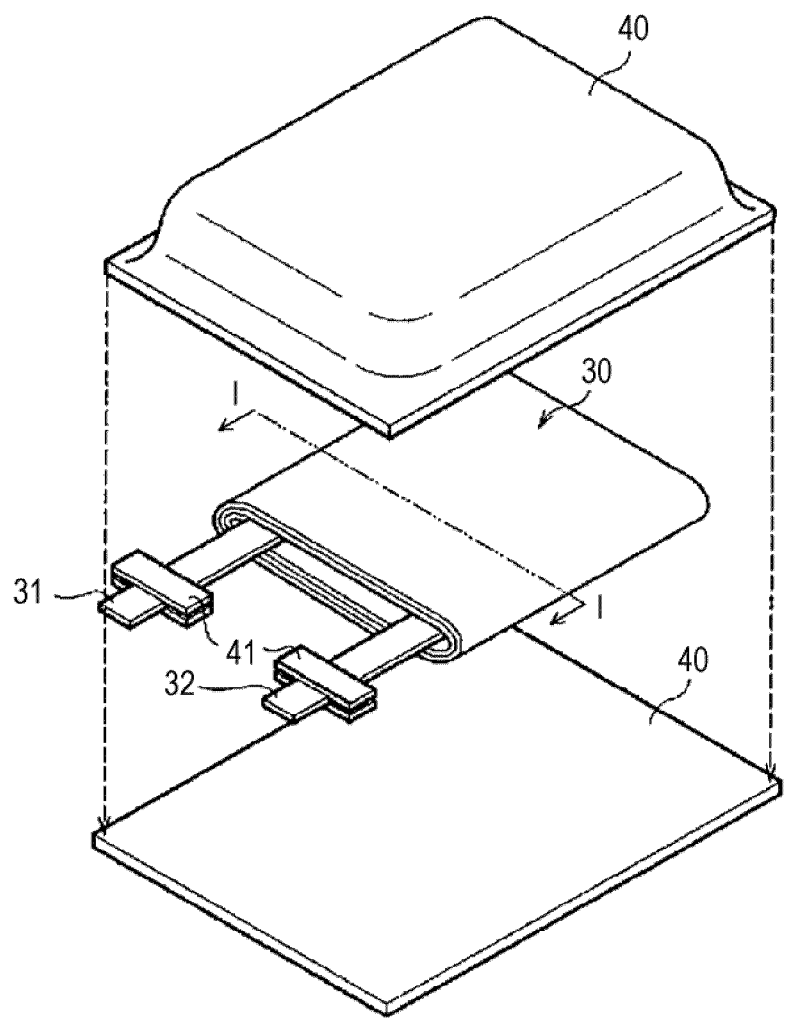
FIG. 5 is a sectional view showing a configuration of a battery according to Embodiment 2 of the present application.

FIG. 5 shows a configuration of a secondary battery according to Embodiment 2. This secondary battery is one which is called a so-called laminated film type and in which a wound electrode body 30 having a positive electrode lead 31 and a negative electrode lead 32 installed therein is housed in the inside of an exterior member 40 in a film form.

The positive electrode lead 31 and the negative electrode lead 32 are each led out in, for example, the same direction from the inside toward the outside of the exterior member 40. The positive electrode lead 31 and the negative electrode lead 32 are each made of a metal material, for example, aluminum, copper, nickel, stainless steel, etc. and formed in a thin plate state or network state.

[Exterior Member]

The exterior member 40 is made of, for example, a rectangular aluminum laminated film obtained by sticking a nylon film, an aluminum foil and a polyethylene film in this order. For example, the exterior member 40 is disposed such that the polyethylene film side and the wound electrode body 30 are opposed to each other, and the respective outer edges are brought into intimate contact with each other by means of fusion or with an adhesive. A contact film 41 is inserted between the exterior member 40 and each of the positive electrode lead 31 and the negative electrode lead 32 for the purpose of preventing invasion of the outside air. The contact film 41 is made of a material having adhesive properties to the positive electrode lead 31 and the negative electrode lead 32, for example, polyolefin resins such as polyethylene, polypropylene, modified polyethylene and modified polypropylene.

The exterior member 40 may be made of a laminated film having other structure, a polymer film such as polypropylene or a metal film in place of the foregoing aluminum laminated film.

[Wound Electrode Body]

Figure 6:
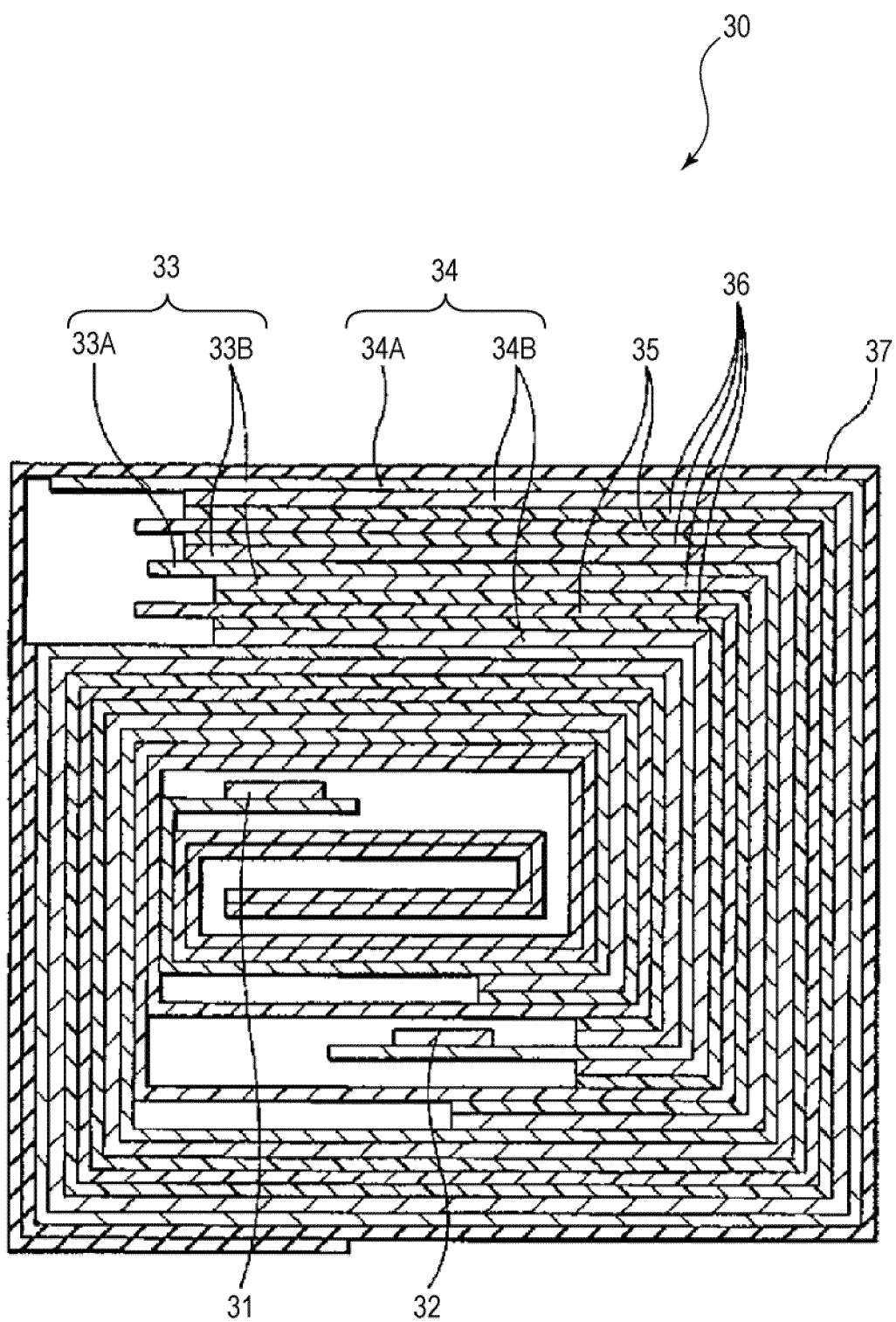
FIG. 6 is a sectional view along an I-I line of a wound electrode body shown in FIG. 5.

FIG. 6 shows a sectional structure along an I-I line of the wound electrode body 30 shown in FIG. 5. The wound electrode body 30 is one prepared by laminating a positive electrode 33 and a negative electrode 34 via a separator 35 and an electrolyte layer 36 and winding the laminate, and an outermost peripheral part thereof is protected by a protective tape 37.

The positive electrode 33 has a structure in which a positive electrode active material layer 33B is provided on one or both of the surfaces of a positive electrode collector 33A. The negative electrode 34 has a structure in which a negative electrode active material layer 34B is provided on one or both of the surfaces of a negative electrode collector 34A. The negative electrode active material layer 34B and the positive electrode active material layer 33B are disposed opposing to each other. The configurations of the positive electrode collector 33A, the positive electrode active material layer 33B, the negative electrode collector 34A, the negative electrode active material layer 34B and the separator 35 are the same as those of the positive electrode collector 21A, the positive electrode active material layer 21B, the negative electrode collector 22A, the negative electrode active material layer 22B and the separator 23, respectively in the foregoing Embodiment 1.

The electrolyte layer 36 contains an electrolytic solution and a polymer compound which will serve as a holding body for holding this electrolytic solution therein and forms a so-called gel. The electrolyte in a gel form is preferable because not only high ionic conductivity can be obtained, but leakage of the battery can be prevented. The configuration of the electrolytic solution (namely, a solvent, an electrolyte salt and the like) is the same as in the secondary battery according to Embodiment 1.

Various polymers capable of absorbing the foregoing electrolytic solution to form a gel can be utilized as the polymer material. Specific examples of the polymer which can be used include fluorine based polymers, for example, poly(vinylidene fluoride), poly(vinylidene fluoride-co-hexafluoropropylene), etc.; ether based polymers, for example, poly(ethylene oxide) and crosslinked materials of the same, etc.; poly(acrylonitrile). In particular, it is desirable to use a fluorine based polymer, for example, polymers of vinylidene fluoride.

(2-2) Manufacturing Method of Secondary Battery

Next, one example of a method for manufacturing a secondary battery according to Embodiment 2 of the present application is described.

First of all, a precursor solution containing an electrolytic solution, a polymer compound and a mixed solvent is coated on each of the positive electrode 33 and the negative electrode 34, and the mixed solvent is vaporized to form the electrolyte layer 36. Thereafter, the positive electrode lead 31 is installed in an end of the positive electrode collector 33A by means of welding, and the negative electrode lead 32 is also installed in an end of the negative electrode collector 34A by means of welding. Subsequently, the positive electrode 33 and the negative electrode 34 each having the electrolyte layer 36 formed thereon are laminated via the separator 35 to form a laminate. This laminate is wound in the longitudinal direction thereof, and the protective tape 37 is allowed to adhere to the outermost peripheral part to form the wound electrode body 30. Finally, for example, the wound electrode body 30 is interposed within the exterior member 40, and the outer edges of the exterior member 40 are brought into intimate contact with each other by means of heat fusion, etc. and sealed. On that occasion, the contact film 41 is inserted between each of the positive electrode lead 31 and the negative electrode lead 32 and the exterior member 40. According to this, the secondary battery shown in FIGS. 3 and 4 is completed.

Also, this secondary battery may be prepared by the following manner. First of all, as described previously, the positive electrode 33 and the negative electrode 34 are prepared; the positive electrode lead 31 and the negative electrode lead 32 are installed in the positive electrode 33 and the negative electrode 34, respectively; the positive electrode 33 and the negative electrode 34 are then laminated via the separator 35 and wound; and the protective tape 37 is allowed to adhere to the outermost peripheral part, thereby forming a wound body serving as a precursor of the wound electrode body 30. Subsequently, this wound body is interposed within the exterior member 40, and the outer edges exclusive of one side are heat fused to form a bag, which is then housed in the inside of the exterior member 40. Subsequently, a composition for electrolyte containing an electrolytic solution, a monomer as a raw material of the polymer compound, a polymerization initiator and optionally other materials such as a polymerization inhibitor is prepared and injected into the inside of the exterior member 40.

After injecting the composition for electrolyte, an opening of the exterior member 40 is heat fused in a vacuum atmosphere and hermetically sealed. Subsequently, the monomer is polymerized upon application of heat to form a polymer compound, thereby forming the electrolyte layer 36 in a gel form. There is thus obtained the secondary battery shown in FIGS. 5 and 6.

The action and effect of this secondary battery are the same as those in the foregoing Embodiment 1. Also, according to Embodiment 2, since the gas generation in the inside of the battery is suppressed by the coating layer containing the element X, expansion and deformation of the secondary battery can be suppressed.

(3) Embodiment 3

(3-1) Positive Electrode Active Material

A positive electrode active material according to Embodiment 3 is provided with a coating layer containing, in at least a part of a complex oxide particle serving as a base material, the foregoing element M as a first element an element M2 as a second element and the foregoing element X as a third element, and the element M, the element M2 and the element X show different distribution from each other in this coating layer.

The complex oxide particle is identical with that in Embodiment 1, and therefore, its detailed explanation is omitted. Also, the coating layer is identical, except that the element M2 is contained as the second element, and therefore, the element M2 as the second element is described in detail while omitting the explanation regarding the element M and the element X.

Elements belonging to the Groups 2 to 13, which have hitherto been applied to substitution, addition, coating or the like relative to lithium cobaltate to be used for the positive electrode active material, can be used as the element M2 as the second element. For example, at least one member among magnesium (Mg), zinc (Zn) and iron (Fe) is preferable as the element M2. Also, the element M and the element M2 are different from each other. Manganese (Mn) is preferable as the element M.

It is preferable that the element M2 as the second element is distributed such that it is interspersed on the surface of the complex oxide particle, thereby forming the coating layer. The element M2 may be, for example, unevenly distributed on the surface of the complex oxide particle, or may be interspersed on plural points over the entire surface. Also, the element M2 may be distributed such that it is interspersed on the coating layer containing the element M. It is estimated that by containing, in addition to the element M, the element M2 different from the element M in the coating layer in distribution which is different from that of the element X and the element M, the compound containing the element M2 protects an active site on the surface of the positive electrode, whereby deterioration of the positive electrode or decomposition of the electrolytic solution is suppressed, and the characteristics are further enhanced.

(3-2) Battery

A battery the same as in Embodiment 1 can be configured by using the foregoing positive electrode active material. The battery of Embodiment 3 is identical with that in Embodiment 1, except for the positive electrode active material, and therefore, its detailed explanation is omitted.

(4) Embodiment 4

A battery the same as in Embodiment 2 can be configured by using the positive electrode active material as described in Embodiment 3. The battery of Embodiment 4 is identical with that in Embodiment 2, except for the positive electrode active material, and therefore, its detailed explanation is omitted.

EXAMPLES

Embodiments according to the present application are specifically described with reference to the following Examples, but it should not be construed that the embodiments according to the present application are limited to these Examples.
<Sample 1>

A preparation method of a positive electrode active material is hereunder described. First of all, lithium cobaltate ($LiCoO_2$) having an average particle size, as measured by the laser scattering process, of 13 μm was prepared as a complex oxide particle serving as a base material. Subsequently, lithium carbonate ($Li_2CO_3$), manganese carbonate ($MnCO_3$) and ammonium phosphate (($NH_4$)$H_2PO_4$) were weighed as a coating material in a molar ratio of lithium (Li) to manganese (Mn) to phosphorus (P) of 3/3/2 and mixed. The obtained mixed powder was weighed in a proportion of 2 wt % relative to 100 wt % of $LiCoO_2$. Subsequently, this mixed powder and $LiCoO_2$ were treated for one hour using a mechanochemical unit, thereby allowing $Li_2CO_3$, $MnCO_3$ and ($NH_4$)$H_2PO_4$ to adhere onto the surface of $LiCoO_2$. There was thus prepared a baking precursor. This baking precursor was subjected to temperature rise at a rate of 3° C. per minute, held at 900° C. for 3 hours and then gradually cooled. There was thus obtained a positive electrode active material having been subjected to a coating treatment on the surface of $LiCoO_2$.

Figure 7A:
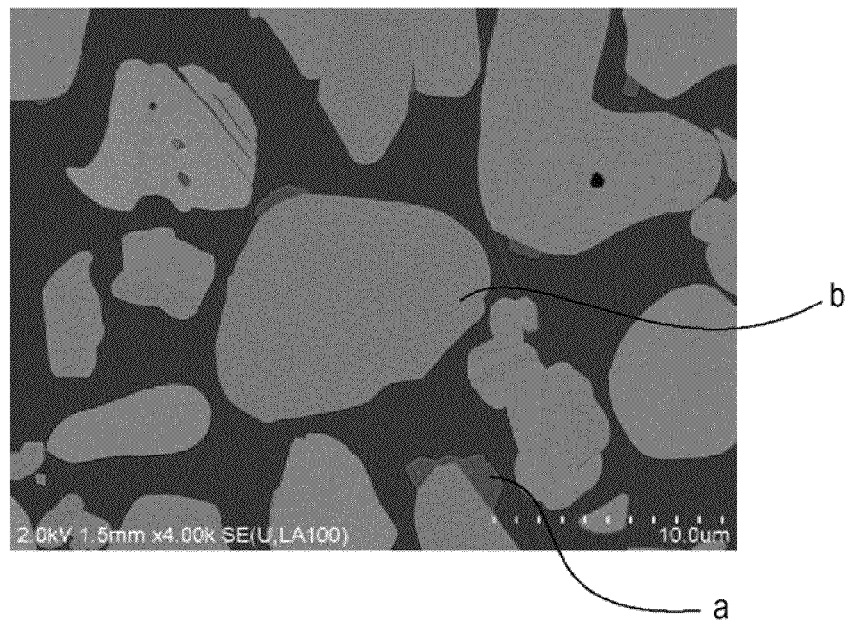
FIGS. 7A, 7B and 7C are each a sectional image of a positive electrode active material of Sample 1.
Figure 7B:
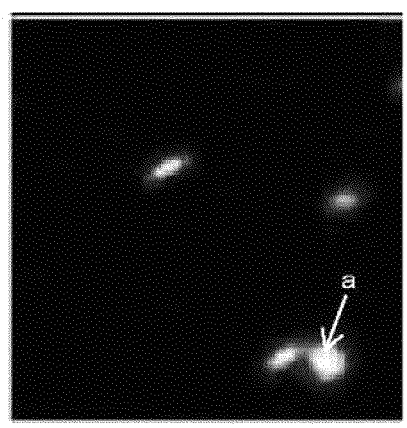
Figure 7C:
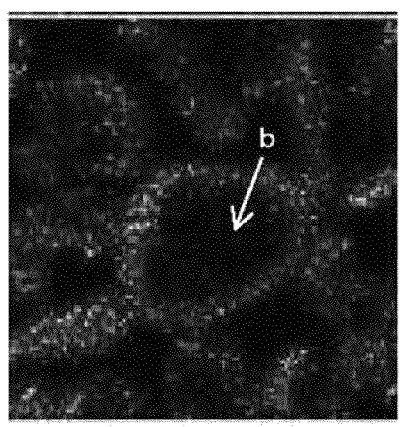

The obtained positive electrode active material powder was observed by SEM/EDX. FIG. 7A is an SEM image of a section of the positive electrode active material of Sample 1. FIG. 7B is a ToF-SIMS image of the section of the positive electrode active material shown in FIG. 7A and shows mapping of $PO_2^+$. Also, FIG. 7C is a ToF-SIMS image of the section of the positive electrode active material shown in FIG. 7A and shows mapping of $MnO_2^+$. Portions shown by "a" in FIGS. 7A and 7B show a corresponding portion each other; and portions shown by "b" in FIGS. 7A and 7C show a corresponding portion each other. As shown in FIGS. 7A, 7B and 7C, it was confirmed that phosphorus (P) was interspersed on the surface of the complex oxide particle and that manganese (Mn) was distributed over the entire surface of the complex oxide particle.

Figure 8:
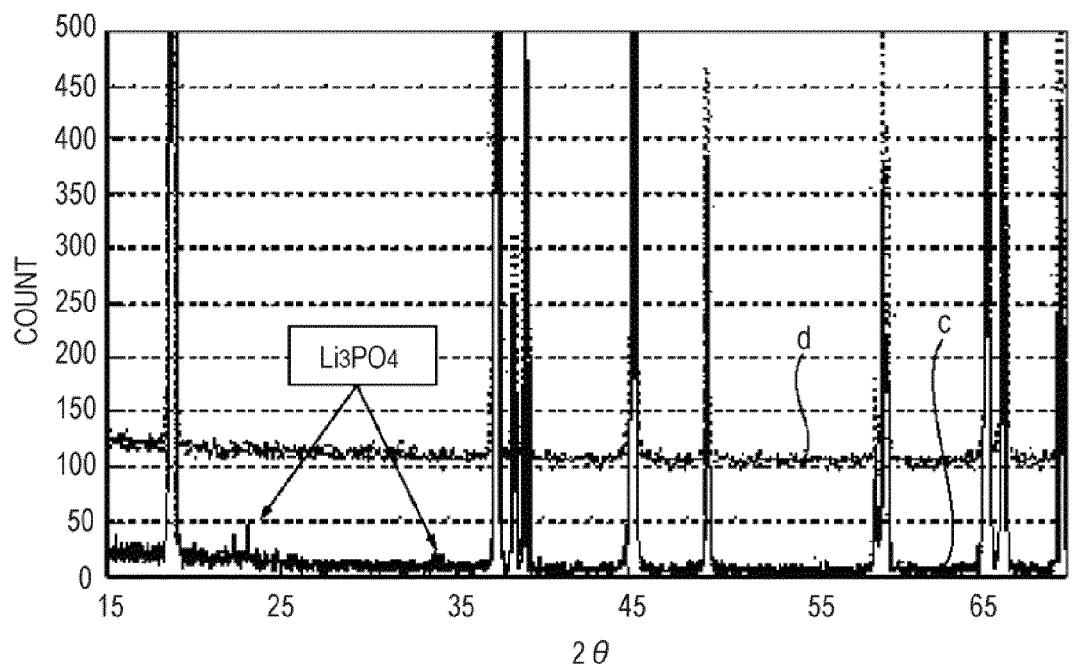
FIG. 8 is an X-ray diffraction pattern of a positive electrode active material powder of each of Sample 1 and Sample 22.

Also, this powder was measured for a powder X-ray diffraction (XRD) pattern using CuKα having a long wavelength. A solid line shown by "c" in FIG. 8 shows an XRD pattern of the positive electrode active material of Sample 1. In Sample 1, in addition to a diffraction peak corresponding to $LiCoO_2$ having a layered rock salt structure, a diffraction peak assigned to $Li_3PO_4$ was confirmed.

Furthermore, an element ratio on the surface of the positive electrode active material particle was measured by ESCA. As a result, Co/(Co+M+X) was found to be 0.40 on the assumption that the element M is an element belonging to the Groups 2 to 13 exclusive of Co and that the element X is P.

Using the thus obtained positive electrode active material, the secondary battery shown in FIGS. 3 and 4 was prepared as described below. First of all, 98 wt % of the foregoing positive electrode active material, 0.8 wt % of an amorphous carbon powder (ketjen black) as a conductive agent and 1.2 wt % of polyvinylidene fluoride (PVdF) as a binder were mixed to prepare a positive electrode mixture. This positive electrode mixture was dispersed in N-methyl-2-pyrrolidone (NMP) to prepare a positive electrode mixture slurry, and this positive electrode mixture slurry was then uniformly coated on the both sides of the positive electrode collector 33A made of a strip-shaped aluminum foil having a thickness of 20 μm. The obtained coated material was dried with warm air and then subjected to compression molding by a roll press to form the positive electrode active material layer 33B. Thereafter, the aluminum-made positive electrode lead 31 was installed in one end of the positive electrode collector 33A.

The negative electrode 34 was prepared in the following manner. First of all, 90 wt % of a graphite powder as a negative electrode active material and 10 wt % of polyvinylidene fluoride (PVDF) as a binder were mixed to prepare a negative electrode mixture. This negative electrode mixture was dispersed in N-methyl-2-pyrrolidone (NMP) to prepare a negative electrode mixture slurry, and the negative electrode mixture slurry was then uniformly coated on the both surfaces of the negative electrode collector 34A made of a strip-shaped copper foil having a thickness of 15 μm. This was further subjected to heat press molding to form the negative electrode active material layer 34B. Thereafter, the nickel-made negative electrode lead 32 was installed in one end of the negative electrode collector 34A.

The separator 35 was prepared in the following manner. First of all, N-methyl-2-pyrrolidone (NMP) was added to polyvinylidene fluoride (PVdF) having an average molecular weight of 150,000 as a matrix resin in a mass ratio of PVdF to NMP of 10/90, and the mixture was thoroughly dissolved, thereby preparing a 10 wt % solution of polyvinylidene fluoride (PVdF) in N-methyl-2-pyrrolidone (NMP).

Subsequently, the prepared slurry was coated on a microporous film made of a polyolefin as a mixture of polyethylene (PE) and polypropylene (PP) to be used as a substrate layer at a rate of 0.1 m/min by a table coater. The substrate layer had a thickness of 7 μm. Thereafter, this substrate layer was dried with hot air. There was thus obtained the separator 35 composed of a microporous film having, as a resin layer, a polyvinylidene fluoride microporous layer having a thickness of 4 μm and a surface density of 0.2 mg/cm².

The prepared separator 35 was measured for an air permeability using a Gurley densometer (manufactured by Toyo Seiki-Sho, Ltd.) in conformity with JIS P8117. As a result, the air permeability was found to be 250 sec/100 cc.

Subsequently, the separator 35, the positive electrode 33 and the negative electrode 34 were laminated in the order of the negative electrode 34, the separator 35, the positive electrode 33 and the separator 35 and wound plural times to prepare the wound electrode body 30. This wound electrode body 30 was interposed within the exterior member 40 made of a moistureproof aluminum laminated film, and the outer edges exclusive of one side were heat fused to form a bag, which was then housed in the inside of the exterior member 40. Thereafter, an electrolytic solution was injected into the inside of the exterior member 40. A non-aqueous electrolytic solution prepared by dissolving $LiPF_6$ in a concentration of 1 mole/dm³ in a mixed solution of ethylene carbonate (EC) and diethyl carbonate (DEC) in a volume mixing ratio of 1/1 was used as the electrolytic solution.

Thereafter, the opening of the exterior member 40 was subjected to vacuum sealing and thermo compression bonding by heat fusion under a reduced pressure, thereby preparing a flat type secondary battery having a size of approximately 34 mm×50 mm×3.8 mm.

The obtained secondary battery was evaluated for battery characteristics in the following manner.

(a) Cycle Characteristic at the Time of High Temperature:

After carrying out constant current-constant voltage charge under a condition at an environmental temperature of 45° C., a charge voltage of 4.40 V and a charge current of 800 mA for a charge time of 2.5 hours, discharge was carried out at a discharge current of 400 mA and a final voltage of 3.0 V, and an initial capacity was measured. Furthermore, charge and discharge were repeated in the same manner as in the case of determining an initial capacity, and a discharge capacity at the 200th cycle was measured, thereby determining a capacity retention rate relative to the initial capacity.

(b) Rate of Increase in Cell Thickness:

The secondary battery from which the initial capacity had been determined was subjected to constant current-constant voltage charge under a condition at a charge voltage of 4.40 V and a charge current of 800 mA for a charge time of 2.5 hours and then stored at 90° C. for 4 hours. There was thus determined a rate of increase in the cell thickness according to an expression of {(cell thickness after storage)−(cell thickness before storage)}/(cell thickness before storage)×100.

<Sample 2>

A positive electrode active material was obtained in the same manner as in the treatment of Sample 1, except that a complex oxide particle having an average composition of $LiCo_{0.98}Al_{0.01}Mg_{0.01}O_2$ was used as the base material.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle.

Also, this powder was measured for a powder X-ray diffraction pattern using CuKα. As a result, in addition to a diffraction peak corresponding to $LiCoO_2$, a diffraction peak assigned to $Li_3PO_4$ was confirmed. Furthermore, an element ratio on the surface of the positive electrode active material particle was measured by ESCA. As a result, Co/(Co+M+X) was found to be 0.30 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 3>

A positive electrode active material was obtained in the same manner as in the treatment of Sample 1, except that a complex oxide particle having an average composition of $LiCo_{0.98}Zr_{0.02}O_{2.02}$ was used as the base material.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ was confirmed. Furthermore, an element ratio on the surface of the positive electrode active material particle was measured by ESCA. As a result, Co/(Co+M+X) was found to be 0.33 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 4>

In the evaluation of battery characteristics, (a) the cycle characteristic at the time of high temperature and (b) the rate of increase in cell thickness were evaluated in the same manner as in Sample 2, except for changing the charge voltage to 4.2V.

<Sample 5>

In the evaluation of battery characteristics, (a) the cycle characteristic at the time of high temperature and (b) the rate of increase in cell thickness were evaluated in the same manner as in Sample 2, except for changing the charge voltage to 4.35 V.

<Sample 6>

In the evaluation of battery characteristics, (a) the cycle characteristic at the time of high temperature and (b) the rate of increase in cell thickness were evaluated in the same manner as in Sample 2, except for changing the charge voltage to 4.5 V.

<Sample 7>

A positive electrode active material was obtained in the same manner as in the treatment of Sample 2, except that in the coating material, the addition amount of the mixed powder of $Li_2CO_3$, $MnCO_3$ and $(NH_4)H_2PO_4$ was changed to 1 wt % relative to 100 wt % of the complex oxide particle.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ was confirmed. Furthermore, an element ratio on the surface of the positive electrode active material particle was measured by ESCA. As a result, Co/(Co+M+X) was found to be 0.51 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 8>

A positive electrode active material was obtained in the same manner as in the treatment of Sample 2, except that in the coating material, the addition amount of the mixed powder of $Li_2CO_3$, $MnCO_3$ and $(NH_4)H_2PO_4$ was changed to 5 wt % relative to 100 wt % of the complex oxide particle.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ was confirmed. Furthermore, an element ratio on the surface of the positive electrode active material particle was measured by ESCA. As a result, Co/(Co+M+X) was found to be 0.22 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 9>

A positive electrode active material was obtained in the same manner as in the treatment of Sample 2, except that in the coating material, the addition amount of the mixed powder of $Li_2CO_3$, $MnCO_3$ and $(NH_4)H_2PO_4$ was changed to 10 wt % relative to 100 wt % of the complex oxide particle.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ was confirmed. Furthermore, an element ratio on the surface of the positive electrode active material particle was measured by ESCA. As a result, Co/(Co+M+X) was found to be 0.19 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 10>

A positive electrode active material was obtained in the same manner as in the treatment of Sample 2, except that in the coating material, the addition amount of the mixed powder of $Li_2CO_3$, $MnCO_3$ and $(NH_4)H_2PO_4$ was changed to 45 wt % relative to 100 wt % of the complex oxide particle.

The obtained positive electrode active material powder was observed by SEM/EDX in the same manner as in Sample 1.

As a result, it was confirmed that Mn was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to LiCoO$_2$, a diffraction peak assigned to Li$_3$PO$_4$ was confirmed. Furthermore, an element ratio on the surface of the positive electrode active material particle was measured by ESCA. As a result, Co/(Co+M+X) was found to be 0.10 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 11>

A positive electrode active material was obtained in the same manner as in the treatment of Sample 2, except that a mixed powder obtained by weighing MnCO$_3$ and (NH$_4$)H$_2$PO$_4$ in a molar ratio of manganese (Mn) to phosphorus (P) of 3/2, respectively and mixing them was used as the coating material.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to LiCoO$_2$, a diffraction peak assigned to Li$_3$PO$_4$ was confirmed. Furthermore, an element ratio on the surface of the positive electrode active material particle was measured by ESCA. As a result, Co/(Co+M+X) was found to be 0.28 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 12>

A positive electrode active material was obtained in the same manner as in the treatment of Sample 2, except that a mixed powder obtained by weighing Li$_2$CO$_3$, magnesium carbonate (MgCO$_3$) and (NH$_4$)H$_2$PO$_4$ in a molar ratio of lithium (Li) to magnesium (Mg) to phosphorus (P) of 3/3/2, respectively and mixing them was used as the coating material.

The obtained positive electrode active material powder was observed by SEM/EDX in the same manner as in Sample 1. As a result, it was confirmed that Mg was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to LiCoO$_2$, a diffraction peak assigned to Li$_3$PO$_4$ was confirmed. Furthermore, an element ratio on the surface of the positive electrode active material particle was measured by ESCA. As a result, Co/(Co+M+X) was found to be 0.39 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 13>

A positive electrode active material was obtained in the same manner as in the treatment of Sample 2, except that a mixed powder obtained by weighing Li$_2$CO$_3$, aluminum hydroxide (Al(OH)$_3$) and (NH$_4$)H$_2$PO$_4$ in a molar ratio of lithium (Li) to aluminum (Al) to phosphorus (P) of 3/3/2, respectively and mixing them was used as the coating material.

The obtained positive electrode active material powder was observed by SEM/EDX in the same manner as in Sample 1. As a result, it was confirmed that Al was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to LiCoO$_2$, a diffraction peak assigned to Li$_3$PO$_4$ was confirmed. Furthermore, an element ratio on the surface of the positive electrode active material particle was measured by ESCA. As a result, Co/(Co+M+X) was found to be 0.62 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample 14>

A positive electrode active material was obtained in the same manner as in the treatment of Sample 2, except that a mixed powder obtained by weighing Li$_2$CO$_3$, MnCO$_3$ and silicon dioxide (SiO$_2$) in a molar ratio of lithium (Li) to manganese (Mn) to silicon (Si) of 3/3/2, respectively and mixing them was used as the coating material.

The obtained positive electrode active material powder was observed by SEM/EDX in the same manner as in Sample 1. As a result, it was confirmed that Mn was distributed over the entire surface of the complex oxide particle and that Si was interspersed on the surface of the complex oxide particle. Also, this powder was measured for a powder X-ray diffraction pattern using CuKα. As a result, in addition to a diffraction peak corresponding to LiCoO$_2$, a diffraction peak assigned to Li$_3$PO$_4$ was confirmed. Furthermore, an element ratio on the surface of the positive electrode active material particle was measured by ESCA. As a result, Co/(Co+M+X) was found to be 0.55 on the assumption that the element M is an element belonging to the Groups 2 to 13 exclusive of Co and that the element X is Si.

A secondary battery was prepared in the same manner as in Sample 1, except for using the thus obtained positive electrode active material, and then evaluated for battery characteristics.

<Sample 15>

A secondary battery was prepared in the same manner as in Sample 1, except that a complex oxide particle which had not been subjected to a coating treatment was used as the positive electrode active substance, and then evaluated for battery characteristics.

<Sample 16>

In the evaluation of battery characteristics, (a) the cycle characteristic at the time of high temperature and (b) the rate of increase in cell thickness were evaluated in the same manner as in Sample 15, except for changing the charge voltage to 4.2 V.

<Sample 17>

In the evaluation of battery characteristics, (a) the cycle characteristic at the time of high temperature and (b) the rate of increase in cell thickness were evaluated in the same manner as in Sample 15, except for changing the charge voltage to 4.35 V.
<Sample 18>
In the evaluation of battery characteristics, (a) the cycle characteristic at the time of high temperature and (b) the rate of increase in cell thickness were evaluated in the same manner as in Sample 15, except for changing the charge voltage to 4.5 V.
<Sample 19>
A positive electrode active material was obtained in the same manner as in the treatment of Sample 1, except that lithium phosphate ($Li_3PO_4$) was used as the coating material.

The obtained positive electrode active material powder was observed by SEM/EDX in the same manner as in Sample 1. As a result, it was confirmed that P was interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ was confirmed. Furthermore, an element ratio on the surface of the positive electrode active material particle was measured by ESCA. As a result, Co/(Co+M+X) was found to be 0.83 on the assumption that the element M is an element belonging to the Groups 2 to 13 exclusive of Co and that the element X is P. Since an element corresponding to the element M does not exist in Sample 19, the Co/(Co+M+X) expresses an element ratio of Co/(Co+X).

A secondary battery was prepared in the same manner as in Sample 1, except for using the thus obtained positive electrode active material, and then evaluated for battery characteristics.
<Sample 20>
A positive electrode active material was obtained in the same manner as in the treatment of Sample 1, except that aluminum phosphate ($Al_3PO_4$) was used as the coating material and that the baking temperature was set up at 300° C.

The obtained positive electrode active material powder was observed by SEM/EDX in the same manner as in Sample 1. As a result, it was confirmed that both Al and P existed over the entire surface of the complex oxide particle. Also, this powder was measured for a powder X-ray diffraction pattern using CuKα. As a result, in addition to a diffraction peak corresponding to $LiCoO_2$, a diffraction peak which is estimated to be assigned to $Al_3PO_4$ was confirmed. Furthermore, an element ratio on the surface of the positive electrode active material particle was measured by ESCA. As a result, Co/(Co+M+X) was found to be 0.38 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.
<Sample 21>
A positive electrode active material was obtained in the same manner as in the treatment of Sample 1, except that magnesium phosphate ($Mg_3(PO_4)_2 \cdot 8H_2O$) was used as the coating material and that the baking temperature was set up at 300° C.

The obtained positive electrode active material powder was observed by SEM/EDX in the same manner as in Sample 1. As a result, it was confirmed that both Mg and P existed over the entire surface of the complex oxide particle. Also, this powder was measured for a powder X-ray diffraction pattern using CuKα. As a result, in addition to a diffraction peak corresponding to $LiCoO_2$, a diffraction peak which is estimated to be assigned to $Mg_3(PO_4)_2$ was confirmed. Furthermore, an element ratio on the surface of the positive electrode active material particle was measured by ESCA. As a result, Co/(Co+M+X) was found to be 0.35 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.
<Sample 22>
A positive electrode active material was obtained in the same manner as in the treatment of Sample 1, except that a mixed powder obtained by weighing $Li_2CO_3$ and manganese phosphate ($Mn_3(PO_4)_2 \cdot 3H_2O$) in a molar ratio of lithium (Li) to manganese (Mn) of 1/1, respectively and mixing them was used as the coating material and that the baking treatment was not carried out.

Figure 9A:
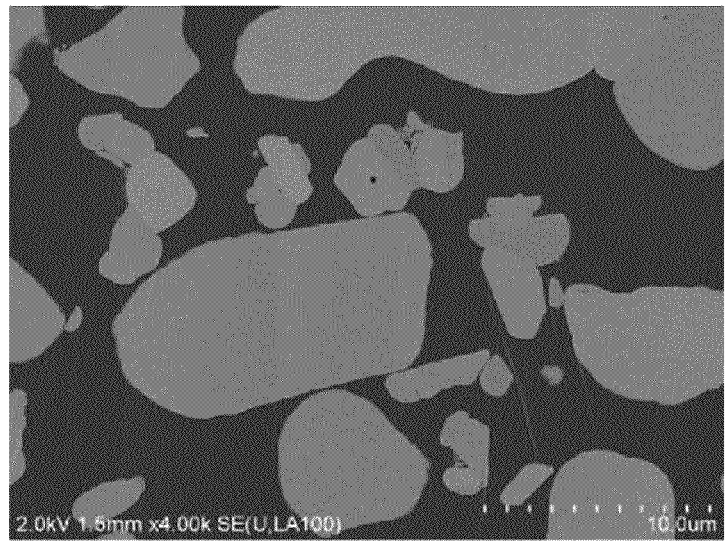
FIGS. 9A, 9B and 9C are each a sectional image of a positive electrode active material of Sample 22.
Figure 9B:
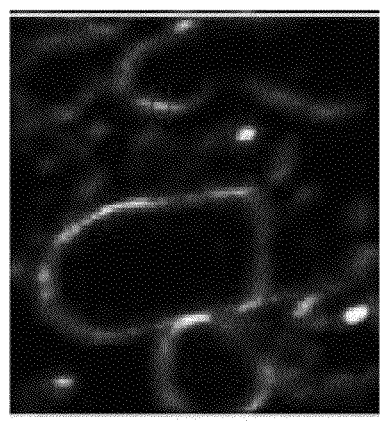
Figure 9C:
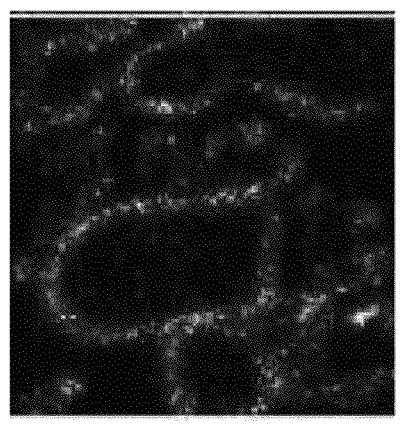

The obtained positive electrode active material powder was observed by SEM/EDX in the same manner as in Sample 1. FIG. 9A is an SEM image of a section of the positive electrode active material of Sample 22. FIG. 9B is a ToF-SIMS image of the section of the positive electrode active material shown in FIG. 9A and shows mapping of $PO_2^+$. Also, FIG. 9C is a ToF-SIMS image of the section of the positive electrode active material shown in FIG. 9A and shows mapping of $MnO_2^+$. As shown in FIGS. 9A, 9B and 9C, it was confirmed that both P and Mn existed over the entire surface of the complex oxide particle.

Also, this powder was measured for a powder X-ray diffraction pattern using CuKα. A dotted line shown by "d" in FIG. 8 shows a powder X-ray diffraction pattern of the positive electrode active material of Sample 22. In Sample 22, in addition to a diffraction peak corresponding to $LiCoO_2$, a diffraction peak which is estimated to be assigned to $Mn_3(PO_4)$ was confirmed.

Furthermore, an element ratio on the surface of the positive electrode active material particle was measured by ESCA. As a result, Co/(Co+M+X) was found to be 0.18 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.
<Sample 23>
A positive electrode active material was obtained in the same manner as in the treatment of Sample 1, except that a mixed powder obtained by weighing $Li_2CO_3$ and $MnCO_3$ in a molar ratio of lithium (Li) to manganese (Mn) of 1/1, respectively and mixing them was used as the coating material.

The obtained positive electrode active material powder was observed by SEM/EDX in the same manner as in Sample 1. As a result, it was confirmed that Mn existed over the entire surface of the complex oxide particle. Also, this powder was measured for a powder X-ray diffraction pattern using CuKα. As a result, in addition to a diffraction peak corresponding to $LiCoO_2$, a diffraction peak which is estimated to be assigned to $MnCO_3$ was confirmed. Furthermore, an element ratio on the surface of the positive electrode active material particle was measured by ESCA. As a result, Co/(Co+M+X) was found to be 0.71 on the assumption that the element M is an element belonging to the Groups 2 to 13 exclusive of Co and that the element X is P. Since an element corresponding to the element X does not exist in Sample 23, the Co/(Co+M+X) expresses an element ratio of Co/(Co+M).

A secondary battery was prepared in the same manner as in Sample 1, except for using the thus obtained positive electrode active material, and then evaluated for battery characteristics.

<Sample 24>

A positive electrode active material was obtained in the same manner as in the treatment of Sample 2, except that a mixed powder obtained by weighing $Li_2CO_3$, $MnCO_3$ and zinc oxide (ZnO) in a molar ratio of lithium (Li) to manganese (Mn) to zinc (Zn) of 3/3/2, respectively was used as the coating material.

The obtained positive electrode active material powder was observed by SEM/EDX in the same manner as in Sample 1. As a result, it was confirmed that Mn was distributed over the entire surface of the complex oxide particle and that Zn was interspersed on the surface of the complex oxide particle. Also, this powder was measured for a powder X-ray diffraction pattern using CuKα. As a result, in addition to a diffraction peak corresponding to $LiCoO_2$, a diffraction peak which is estimated to be assigned to $MnCO_3$ was confirmed. Furthermore, an element ratio on the surface of the positive electrode active material particle was measured by ESCA. As a result, Co/(Co+M+X) was found to be 0.58 on the assumption that the element M is an element belonging to the Groups 2 to 13 exclusive of Co and Zn and that the element X is Zn.

A secondary battery was prepared in the same manner as in Sample 1, except for using the thus obtained positive electrode active material, and then evaluated for battery characteristics.

<Sample A>

A positive electrode active material was obtained in the same manner as in the treatment of Sample 2, except that a mixed powder obtained by weighing $Li_2CO_3$, $MgCO_3$, $MnCO_3$ and $(NH_4)H_2PO_4$ in a molar ratio of lithium (Li) to magnesium (Mg) to manganese (Mn) to phosphorus (P) of 3/3/3/2, respectively was used as the coating material.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, it was confirmed that Mg was interspersed on the complex oxide particle in different distribution from that of P. Also, this powder was measured for a powder X-ray diffraction pattern using CuKα. As a result, in addition to a diffraction peak corresponding to $LiCoO_2$, a diffraction peak assigned to $Li_3PO_4$ and a diffraction peak assigned to MgO were confirmed. Furthermore, an element ratio on the surface of the positive electrode active material particle was measured by ESCA. As a result, Co/(Co+M+M2+X) was found to be 0.22 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample B>

A positive electrode active material was obtained in the same manner as in the treatment of Sample 2, except that a mixed powder obtained by weighing $Li_2CO_3$, $Zn(CH_3COO)_2 \cdot 2H_2O$, $MnCO_3$ and $(NH_4)H_2PO_4$ in a molar ratio of lithium (Li) to zinc (Zn) to manganese (Mn) to phosphorus (P) of 3/3/3/2, respectively was used as the coating material.

The obtained positive electrode active material powder was observed by SEM/EDX in the same manner as in Sample 1. As a result, it was confirmed that Mn was distributed over the entire surface of the complex oxide particle and that Zn and P were interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ and a diffraction peak assigned to ZnO were confirmed. Furthermore, an element ratio on the surface of the positive electrode active material particle was measured by ESCA. As a result, Co/(Co+M+M2+X) was found to be 0.32 on the assumption that the element M is an element belonging to the Groups 2 to 13 exclusive of Co and Zn and that the element X is P.

A secondary battery was prepared in the same manner as in Sample 1, except for using the thus obtained positive electrode active material, and then evaluated for battery characteristics.

<Sample C>

A positive electrode active material was obtained in the same manner as in the treatment of Sample 2, except that a mixed powder obtained by weighing $Li_2CO_3$, $Fe_3O_4$, $MnCO_3$ and $(NH_4)H_2PO_4$ in a molar ratio of lithium (Li) to iron (Fe) to manganese (Mn) to phosphorus (P) of 3/3/3/2, respectively was used as the coating material.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, it was confirmed that Fe was interspersed on the complex oxide particle in different distribution from that of P. Also, this powder was measured for a powder X-ray diffraction pattern using CuKα. As a result, in addition to a diffraction peak corresponding to $LiCoO_2$, a diffraction peak assigned to $Li_3PO_4$ and a diffraction peak assigned to a complex oxide of Li and Fe were confirmed. Furthermore, an element ratio on the surface of the positive electrode active material particle was measured by ESCA. As a result, Co/(Co+M+M2+X) was found to be 0.24 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample D>

A positive electrode active material was obtained in the same manner as in the treatment of Sample 1, except that a complex oxide particle having an average composition of $LiCo_{0.98}Al_{0.01}Mg_{0.01}S_{0.001}O_2$ was used as the base material.

The obtained positive electrode active material powder was observed by SEM/EDX in the same manner as in Sample 1. As a result, it was confirmed that Mn was distributed over the entire surface of the complex oxide particle and that phosphorus (P) was interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ was confirmed. A commercially available software program was used for the wave analysis. An element ratio on the surface of the positive electrode active material particle was measured by ESCA. As a result, Co/(Co+M+M2+X) was found to be 0.30 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

Also, the secondary battery whose capacity had been measured was taken apart; the positive electrode was taken out, rinsed with dimethyl carbonate and dried in vacuo; and the surface of the positive electrode was analyzed by ESCA. As a result, an S2p spectrum was confirmed in a region of from 165 eV to 170 eV. In the analysis by XPS, C was used for the correction of spectral energy. Specifically, a C1s spectrum of the sample was measured, wave analysis was carried out, and the position of a main peak existing on the minimum bound energy side was defined as 284.3 eV. A commercially available software program was used for the wave analysis.

<Sample E>

A secondary battery was prepared in the same manner as in Sample A, except that a complex oxide particle which had not been subjected to a coating treatment was used as the positive electrode active material, and then evaluated for battery characteristics.

Also, the secondary battery whose capacity had been measured was taken apart; the positive electrode was taken out, rinsed with dimethyl carbonate and dried in vacuo; and the surface of the positive electrode was analyzed by ESCA. As a result, an S2p spectrum was confirmed in a region of from 165 eV to 170 eV. In the analysis by XPS, C was used for the correction of spectral energy. Specifically, a C1s spectrum of the sample was measured, wave analysis was carried out, and the position of a main peak existing on the minimum bound energy side was defined as 284.3 eV. A commercially available software program was used for the wave analysis.

<Sample F>

A positive electrode active material was obtained in the same manner as in the treatment of Sample 22, except that a mixed powder obtained by weighing $Li_2CO_3$, $MgCO_3$, $MnCO_3$ and $(NH_4)H_2PO_4$ in a molar ratio of lithium (Li) to magnesium (Mg) to manganese (Mn) to phosphorus (P) of 3/3/3/2, respectively was used as the coating material.

The obtained positive electrode active material powder was observed by SEM/EDX in the same manner as in Sample 1. As a result, it was confirmed that all of phosphorus (P), manganese (Mn), magnesium (Mg) and lithium (Li) uniformly existed over the entire surface of the complex oxide particle. An element ratio on the surface of the positive electrode active material particle was measured by ESCA. As a result, Co/(Co+M+M2+X) was found to be 0.11 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample G>

A positive electrode active material was obtained in the same manner as in the treatment of Sample 22, except that a mixed powder obtained by weighing $Li_2CO_3$, $MnCO_3$ and $(NH_4)H_2PO_4$ in a molar ratio of lithium (Li) to manganese (Mn) to phosphorus (P) of 3/3/2, respectively was used as the coating material.

The obtained positive electrode active material powder was observed by SEM/EDX in the same manner as in Sample 1. As a result, it was confirmed that all of phosphorus (P), manganese (Mn) and lithium (Li) uniformly existed over the entire surface of the complex oxide particle. An element ratio on the surface of the positive electrode active material particle was measured by ESCA. As a result, Co/(Co+M+M2+X) was found to be 0.22 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample H>

A positive electrode active material was obtained in the same manner as in the treatment of Sample 22, except that a mixed powder obtained by weighing $Li_2CO_3$, $MnCO_3$ and $MgCO_3$ in a molar ratio of lithium (Li) to manganese (Mn) to magnesium (Mg) of 3/3/3, respectively was used as the coating material.

The obtained positive electrode active material powder was observed by SEM/EDX in the same manner as in Sample 1. As a result, it was confirmed that all of manganese (Mn), magnesium (Mg) and lithium (Li) uniformly existed over the entire surface of the complex oxide particle. An element ratio on the surface of the positive electrode active material particle was measured by ESCA. As a result, Co/(Co+M+M2+X) was found to be 0.14 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample I>

A baking precursor was prepared in the same manner as in Sample 1. This baking precursor was subjected to temperature rise at a rate of 3° C. per minute, held at 1,000° C. for 48 hours and then gradually cooled, thereby obtaining a positive electrode active material. The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. An element ratio on the surface of the positive electrode active material particle was measured by ESCA. As a result, Co/(Co+M+X) was found to be 0.75 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

<Sample J>

A positive electrode active material was obtained in the same manner as in the treatment of Sample 2, except that a mixed powder obtained by weighing lithium carbonate ($Li_2CO_3$), manganese carbonate ($MnCO_3$), ammonium phosphate (($NH_4$)$H_2PO_4$) and sulfur (S) in a molar ratio of lithium (Li) to manganese (Mn) to phosphorus (P) to sulfur (S) of 3/3/2/0.3, respectively was used as the coating material.

The obtained positive electrode active material powder was observed by SEM/EDX in the same manner as in Sample 1. As a result, it was confirmed that Mn was distributed over the entire surface of the complex oxide particle and that P was interspersed on the surface of the complex oxide particle. Also, this powder was measured for a powder X-ray diffraction pattern using CuKα. As a result, in addition to a diffraction peak corresponding to $LiCoO_2$, a diffraction peak assigned to $Li_3PO_4$ was confirmed. A commercially available software program was used for the wave analysis. An element ratio on the surface of the positive electrode active material particle was measured by ESCA. As a result, Co/(Co+M+X)

was found to be 0.30 on the assumption that the element M is an element belonging to the Groups 2 to 13 exclusive of Co and that the element X is P.

A secondary battery was prepared in the same manner as in Sample 1, except for using the thus obtained positive electrode active material, and then evaluated for battery characteristics.

Also, the secondary battery whose capacity had been measured was taken apart; the positive electrode was taken out, rinsed with dimethyl carbonate and dried in vacuo; and the surface of the positive electrode was analyzed by ESCA. As a result, an S2p spectrum was confirmed in a region of from 165 eV to 170 eV. In the analysis by XPS, C was used for the correction of spectral energy. Specifically, a C1s spectrum of the sample was measured, wave analysis was carried out, and the position of a main peak existing on the minimum bound energy side was defined as 284.3 eV. A commercially available software program was used for the wave analysis.

The positive electrode active materials used in Samples 1 to 24 and Samples A to J and the results of evaluation of battery characteristics obtained in these samples are summarized and shown in Tables 1, 2 and 3. In Tables 1 and 2, the addition amount of the coating material shows an addition amount when the amount of the base material is defined as 100 wt %. Also, in Tables 1 and 2, in the composition of the whole of particles of $M/(Co+M)$, a composition of the element M relative to the element M and cobalt (Co) contained in the whole of particles (the whole of the positive electrode active material) is shown. Also, in Tables 1 and 2, in the composition of the whole of particles of $(M+X)/(Co+M+X)$, a composition of the element M and the element X relative to the element M, the element X and cobalt (Co) contained in the whole of particles is shown.

TABLE 1

| | Base material | Coating material | Addition amount of coating material [wt %] | Distribution state of M and X | Surface composition of $Co/(Co + M + X)$ | Composition of the whole of particles of $M/(Co + M)$ | Composition of the whole of particles of $(M + X)/(Co + M + X)$ |
|---|---|---|---|---|---|---|---|
| Sample 1 | $LiCoO_2$ | $Li_2CO_3 + MnCO_3 + (NH_4)H_2PO_4$ | 2.0 | Different | 0.40 | 0.009 | 0.014 |
| Sample 2 | $LiCo_{0.98}Al_{0.01}Mg_{0.01}O_2$ | $Li_2CO_3 + MnCO_3 + (NH_4)H_2PO_4$ | 2.0 | Different | 0.30 | 0.029 | 0.034 |
| Sample 3 | $LiCo_{0.98}Zr_{0.02}O_{2.02}$ | $Li_2CO_3 + MnCO_3 + (NH_4)H_2PO_4$ | 2.0 | Different | 0.33 | 0.029 | 0.034 |
| Sample 4 | $LiCo_{0.98}Al_{0.01}Mg_{0.01}O_2$ | $Li_2CO_3 + MnCO_3 + (NH_4)H_2PO_4$ | 2.0 | Different | 0.30 | 0.029 | 0.034 |
| Sample 5 | $LiCo_{0.98}Al_{0.01}Mg_{0.01}O_2$ | $Li_2CO_3 + MnCO_3 + (NH_4)H_2PO_4$ | 2.0 | Different | 0.30 | 0.029 | 0.034 |
| Sample 6 | $LiCo_{0.98}Al_{0.01}Mg_{0.01}O_2$ | $Li_2CO_3 + MnCO_3 + (NH_4)H_2PO_4$ | 2.0 | Different | 0.30 | 0.029 | 0.034 |
| Sample 7 | $LiCo_{0.98}Al_{0.01}Mg_{0.01}O_2$ | $Li_2CO_3 + MnCO_3 + (NH_4)H_2PO_4$ | 1.0 | Different | 0.51 | 0.024 | 0.027 |
| Sample 8 | $LiCo_{0.98}Al_{0.01}Mg_{0.01}O_2$ | $Li_2CO_3 + MnCO_3 + (NH_4)H_2PO_4$ | 5.0 | Different | 0.22 | 0.042 | 0.054 |
| Sample 9 | $LiCo_{0.98}Al_{0.01}Mg_{0.01}O_2$ | $Li_2CO_3 + MnCO_3 + (NH_4)H_2PO_4$ | 10.0 | Different | 0.19 | 0.062 | 0.086 |
| Sample 10 | $LiCo_{0.98}Al_{0.01}Mg_{0.01}O_2$ | $Li_2CO_3 + MnCO_3 + (NH_4)H_2PO_4$ | 45.0 | Different | 0.10 | 0.184 | 0.256 |
| Sample 11 | $LiCo_{0.98}Al_{0.01}Mg_{0.01}O_2$ | $MnCO_3 + (NH_4)H_2PO_4$ | 2.0 | Different | 0.28 | 0.030 | 0.036 |
| Sample 12 | $LiCo_{0.98}Al_{0.01}Mg_{0.01}O_2$ | $Li_2CO_3 + MgCO_3 + (NH_4)H_2PO_4$ | 2.0 | Different | 0.39 | 0.030 | 0.036 |
| Sample 13 | $LiCo_{0.98}Al_{0.01}Mg_{0.01}O_2$ | $Li_2CO_3 + Al(OH)_3 + (NH_4)H_2PO_4$ | 2.0 | Different | 0.62 | 0.030 | 0.036 |
| Sample 14 | $LiCo_{0.98}Al_{0.01}Mg_{0.01}O_2$ | $Li_2CO_3 + MnCO_3 + SiO_2$ | 2.0 | Different | 0.55 | 0.030 | 0.037 |
| Sample 15 | $LiCoO_2$ | — | — | — | — | — | — |
| Sample 16 | $LiCoO_2$ | — | — | — | — | — | — |
| Sample 17 | $LiCoO_2$ | — | — | — | — | — | — |
| Sample 18 | $LiCoO_2$ | — | — | — | — | — | — |
| Sample 19 | $LiCoO_2$ | $Li_3PO_4$ | 2.0 | — | 0.83 | 0.000 | 0.017 |
| Sample 20 | $LiCoO_2$ | $AlPO_4$ | 2.0 | Identical | 0.38 | 0.016 | 0.031 |
| Sample 21 | $LiCoO_2$ | $Mg_3(PO_4)_2 \cdot 8H_2O$ | 2.0 | Identical | 0.35 | 0.014 | 0.023 |
| Sample 22 | $LiCoO_2$ | $Li_2CO_3 + Mn_3(PO_4)_2 \cdot 3H_2O$ | 2.0 | Identical | 0.18 | 0.011 | 0.018 |
| Sample 23 | $LiCoO_2$ | $Li_2CO_3 + MnCO_3$ | 2.0 | — | 0.71 | 0.013 | 0.013 |
| Sample 24 | $LiCo_{0.98}Al_{0.01}Mg_{0.01}O_2$ | $Li_2CO_3 + MnCO_3 + ZnO$ | 2.0 | Different | 0.58 | 0.030 | 0.037 |

TABLE 2

| | Base material | Coating material | Addition amount of coating material [wt %] | M | M2 | Distribution state of M, M2 and X | Surface composition of $Co/(Co + M + M2 + X)$ | Composition of the whole of particles of $M/Co + M + M2)$ | Composition of the whole of particles of $(M + M2 + X)/(Co + M + M2 + X)$ |
|---|---|---|---|---|---|---|---|---|---|
| Sample A | $LiCo_{0.98}Al_{0.01}Mg_{0.01}O_2$ | $Li_2CO_3 + MgCO_3 + MnCO_3 + (NH_4)H_2PO_4$ | 3.0 | Mn | Mg | Different | 0.22 | 0.039 | 0.045 |
| Sample B | $LiCo_{0.98}Al_{0.01}Mg_{0.01}O_2$ | $Li_2CO_3 + Zn(CH_3COO)_2 \cdot 2H_2O + MnCO_3 + (NH_4)H_2PO_4$ | 4.0 | Mn | Zn | Different | 0.32 | 0.039 | 0.045 |
| Sample C | $LiCo_{0.98}Al_{0.01}Mg_{0.01}O_2$ | $Li_2CO_3 + Fe_3O_4 + MnCO_3 + (NH_4)H_2PO_4$ | 3.0 | Mn | Fe | Different | 0.24 | 0.039 | 0.045 |
| Sample D | $LiCo_{0.98}Al_{0.01}Mg_{0.01}S_{0.001}O_2$ | $Li_2CO_3 + MnCO_3 + (NH_4)H_2PO_4$ | 2.0 | Mn | — | Different | 0.30 | 0.029 | 0.034 |
| Sample E | $LiCo_{0.98}Al_{0.01}Mg_{0.01}S_{0.001}O_2$ | — | — | — | — | — | — | — | — |
| Sample F | $LiCo_{0.98}Al_{0.01}Mg_{0.01}O_2$ | $Li_2CO_3 + MgCO_3 + MnCO_3 + (NH_4)H_2PO_4$ | 3.0 | Mn | Mg | Identical | 0.11 | 0.039 | 0.045 |

TABLE 2-continued

| | Base material | Coating material | Addition amount of coating material [wt %] | M | M2 | Distribution state of M, M2 and X | Surface composition of Co/(Co + M + M2 + X) | Composition of the whole of particles of M/Co+ M + M2) | Composition of the whole of particles of (M + M2 + X)/ (Co + M + M2 + X) |
|---|---|---|---|---|---|---|---|---|---|
| Sample G | LiCo$_{0.98}$Al$_{0.01}$Mg$_{0.01}$O$_2$ | Li$_2$CO$_3$ + MnCO$_3$ + (NH$_4$)H$_2$PO$_4$ | 2.0 | Mn | — | Identical | 0.22 | 0.029 | 0.034 |
| Sample H | LiCo$_{0.98}$Al$_{0.01}$Mg$_{0.01}$O$_2$ | Li$_2$CO$_3$ + MgCO$_3$ + MnCO$_3$ | 2.0 | Mn | Mg | Identical (no X) | 0.14 | 0.034 | — |
| Sample I | LiCoO$_2$ | Li$_2$CO$_3$ + MnCO$_3$ + (NH$_4$)H$_2$PO$_4$ | 2.0 | Mn | — | Different | 0.75 | 0.009 | 0.014 |
| Sample J | LiCo$_{0.98}$Al$_{0.01}$Mg$_{0.01}$O$_2$ | Li$_2$CO$_3$ + MnCO$_3$ + (NH$_4$)H$_2$PO$_4$ + S | 2.0 | Mn | — | Different | 0.30 | 0.029 | 0.034 |

TABLE 3

| | Initial capacity [mAh] | Capacity retention rate [%] | Rate of increase in thickness [%] | Voltage [V] |
|---|---|---|---|---|
| Sample 1 | 800 | 75 | 10 | 4.4 |
| Sample 2 | 800 | 81 | 9 | 4.4 |
| Sample 3 | 800 | 83 | 11 | 4.4 |
| Sample 4 | 720 | 85 | 3 | 4.2 |
| Sample 5 | 770 | 85 | 5 | 4.35 |
| Sample 6 | 840 | 73 | 27 | 4.5 |
| Sample 7 | 800 | 80 | 11 | 4.4 |
| Sample 8 | 780 | 78 | 8 | 4.4 |
| Sample 9 | 750 | 75 | 8 | 4.4 |
| Sample 10 | 560 | 48 | 8 | 4.4 |
| Sample 11 | 790 | 75 | 13 | 4.4 |
| Sample 12 | 790 | 71 | 20 | 4.4 |
| Sample 13 | 780 | 71 | 24 | 4.4 |
| Sample 14 | 780 | 69 | 28 | 4.4 |
| Sample 15 | 800 | 54 | 38 | 4.4 |
| Sample 16 | 720 | 82 | 10 | 4.2 |
| Sample 17 | 770 | 66 | 24 | 4.35 |
| Sample 18 | 840 | 38 | 80 | 4.5 |
| Sample 19 | 780 | 57 | 36 | 4.4 |
| Sample 20 | 780 | 44 | 30 | 4.4 |
| Sample 21 | 780 | 41 | 40 | 4.4 |
| Sample 22 | 750 | 35 | 85 | 4.4 |
| Sample 23 | 730 | 27 | 42 | 4.4 |
| Sample 24 | 750 | 44 | 40 | 4.4 |
| Sample A | 790 | 85 | 7 | 4.4 |
| Sample B | 790 | 79 | 7 | 4.4 |
| Sample C | 790 | 84 | 9 | 4.4 |
| Sample D | 800 | 85 | 10 | 4.4 |
| Sample E | 800 | 50 | 38 | 4.4 |
| Sample F | 720 | 32 | 100 | 4.4 |
| Sample G | 750 | 34 | 79 | 4.4 |
| Sample H | 750 | 45 | 88 | 4.4 |
| Sample I | 750 | 51 | 44 | 4.4 |
| Sample J | 800 | 85 | 9 | 4.4 |

As is clear from, for example, the comparison of Sample 1 with Sample 15 in Tables 1 and 3, by providing the complex oxide particle with the coating layer, a lowering of the capacity retention rate and an increase of the rate of increase in thickness could be suppressed.

Also, as is clear from, for example, the comparison of Sample 1 with Samples 19 and 23, by incorporating the element M and the element X in the coating layer, a lowering of the capacity retention rate and an increase of the rate of increase in thickness could be suppressed. Also, as is clear from, for example, the comparison of Samples 1, 12 and 13 with Samples 20 to 22, in the case where the element M and the element X are different in the distribution state from each other, a lowering of the capacity retention rate and an increase of the rate of increase in thickness could be suppressed.

Also, in Sample 24 having the element M and zinc in the coating layer and having a different distribution state between the element M and zinc, the rate of increase in thickness increased to the same extent as in Sample 23 not containing the element X in the coating layer. It may be considered that this was caused due to the fact that zinc did not form a compound upon reaction with lithium on the surface of the complex oxide particle so that it could not suppress the gas generation by an excessive lithium oxide existing on the surface of the complex oxide, such as Li$_2$CO$_3$.

Also, the characteristics could be more improved by carrying out the coating treatment by adding magnesium (Mg) as the element M2 as seen in Sample A, or by allowing S to exist on the surface as seen in Sample D. It may be estimated that the characteristics were more enhanced due to the fact that an active site on the surface of the positive electrode was protected by the element M2-containing compound or S, thereby suppressing deterioration of the positive electrode or decomposition of the electrolytic solution.

It was noted from the foregoing results that by using a positive electrode active material including a complex oxide particle containing lithium and cobalt, having provided thereon a coating layer containing at least one element M which is different from the principal transition metal constituting the complex oxide particle and which is selected among elements belonging to the Groups 2 to 13 and an element X which is phosphorus (P) or silicon (Si), wherein the element M and the element X show a different distribution state from each other, both a high initial capacity and a high capacity retention rate can be made compatible with each other, and the rate of increase in thickness at a high temperature can be suppressed. Also, it was noted from Sample 10 that when a relation of 0<(M+X)/(Co+M+X)<0.25 is satisfied, the initial capacity and the capacity retention rate can be more enhanced. Also, it was noted from Samples 1 to 14 that when a relation of Co/(Co+M+X)<0.70 is satisfied, the initial capacity and the capacity retention rate can be enhanced, and the gas retention can be suppressed.

<Sample 25>

A secondary battery was prepared in the same manner as in Sample 1, except for changing the thickness of the substrate layer of the separator to 5 μm, and then evaluated for battery characteristics. The resin layer of this separator had a surface density of 0.2 mg/cm$^2$. Also, the separator had an air permeability, as measured in conformity with JIS P8117, of 210 sec/100 cc.

<Sample 26>

A secondary battery was prepared in the same manner as in Sample 1, except for changing the thickness of the substrate layer of the separator to 9 μm, and then evaluated for battery characteristics. The resin layer of this separator had a surface density of 0.2 mg/cm². Also, the separator had an air permeability, as measured in conformity with JIS P8117, of 290 sec/100 cc.
<Sample 27>
A secondary battery was prepared in the same manner as in Sample 1, except for changing the thickness of the substrate layer of the separator to 12 μm, and then evaluated for battery characteristics. The resin layer of this separator had a surface density of 0.3 mg/cm². Also, the separator had an air permeability, as measured in conformity with JIS P8117, of 390 sec/100 cc.
<Sample 28>
A secondary battery was prepared in the same manner as in Sample 1, except for changing the thickness of the substrate layer of the separator to 20 μm, and then evaluated for battery characteristics. The resin layer of this separator had a surface density of 0.2 mg/cm². Also, the separator had an air permeability, as measured in conformity with JIS P8117, of 600 sec/100 cc.
<Sample 29>
A secondary battery was prepared in the same manner as in Sample 1, except that in the preparation of a separator, the operation rate of the table coater at the time of coating the matrix resin-containing slurry on the substrate layer was changed to 5 m/min, and then evaluated for battery characteristics. The resin layer of this separator had a surface density of 0.2 mg/cm². Also, the separator had an air permeability, as measured in conformity with JIS P8117, of 600 sec/100 cc.
<Sample 30>
A secondary battery was prepared in the same manner as in Sample 1, except that a microporous film made of polyethylene (PE) was used as the substrate layer of the separator, and then evaluated for battery characteristics. The resin layer of this separator had a surface density of 0.2 mg/cm². Also, the separator had an air permeability, as measured in conformity with JIS P8117, of 320 sec/100 cc.
<Sample 31>
A secondary battery was prepared in the same manner as in Sample 1, except that a microporous film prepared by laminating polypropylene (PP), polyethylene (PE) and polypropylene (PP) in success so as to have a three-layered (PP/PE/PP) structure was used as the substrate layer of the separator, and then evaluated for battery characteristics. The resin layer of this separator had a surface density of 0.2 mg/cm². Also, the separator had an air permeability, as measured in conformity with JIS P8117, of 250 sec/100 cc.
<Sample 32>
A secondary battery was prepared in the same manner as in Sample 1, except that in the preparation of a separator, polytetrafluoroethylene (PTFE) was used as the matrix resin, and then evaluated for battery characteristics. The resin layer of this separator had a surface density of 0.2 mg/cm². Also, the separator had an air permeability, as measured in conformity with JIS P8117, of 250 sec/100 cc.
<Sample 33>
A secondary battery was prepared in the same manner as in Sample 1, except that in the preparation of a separator, a polyvinylidene fluoride-hexafluoropropylene (PVdF-HEP) copolymer was used as the matrix resin, and then evaluated for battery characteristics. The resin layer of this separator had a surface density of 0.2 mg/cm². Also, the separator had an air permeability, as measured in conformity with JIS P8117, of 290 sec/100 cc.
<Sample 34>
A secondary battery was prepared in the same manner as in Sample 1, except that an Al₂O₃ (alumina) fine powder having an average particle size of 250 nm was added in an amount of two times the mass of PVdF to the resin layer of the separator, and then evaluated for battery characteristics. The resin layer of this separator had a surface density of 0.2 mg/cm². Also, the separator had an air permeability, as measured in conformity with JIS P8117, of 270 sec/100 cc.
<Sample 35>
A secondary battery was prepared in the same manner as in Sample 1, except that a 7 μm-thick microporous film made of a polyolefin as a mixture of polyethylene (PE) and polypropylene (PP) without coating the matrix resin-containing slurry was used as the separator, and then evaluated for battery characteristics. This separator had an air permeability, as measured in conformity with JIS P8117, of 200 sec/100 cc.
<Sample 36>
A secondary battery was prepared in the same manner as in Sample 1, except for changing the surface density of the resin layer of the separator to 0.6 mg/cm², and then evaluated for battery characteristics. This separator had an air permeability, as measured in conformity with JIS P8117, of 560 sec/100 cc.
<Sample 37>
A secondary battery was prepared in the same manner as in Sample 1, except that in the preparation of a separator, the operation rate of the table coater at the time of coating the matrix resin-containing slurry on the substrate layer was changed to 10 m/min, and then evaluated for battery characteristics. The resin layer of this separator had a surface density of 0.2 mg/cm². Also, the separator had an air permeability, as measured in conformity with JIS P8117, of 1,050 sec/100 cc.
<Sample 38>
A secondary battery was prepared in the same manner as in Sample 15, except that a microporous film prepared by laminating polypropylene (PP), polyethylene (PE) and polypropylene (PP) in success so as to have a three-layered (PP/PE/PP) structure was used as the substrate layer of the separator, and then evaluated for battery characteristics. The resin layer of this separator had a surface density of 0.2 mg/cm². Also, the separator had an air permeability, as measured in conformity with JIS P8117, of 250 sec/100 cc.
<Sample 39>
A secondary battery was prepared in the same manner as in Sample 15, except that a 7 μm-thick microporous film made of a polyolefin as a mixture of polyethylene (PE) and polypropylene (PP) without coating the matrix resin-containing slurry was used as the separator, and then evaluated for battery characteristics. This separator had an air permeability, as measured in conformity with JIS P8117, of 200 sec/100 cc.
<Sample 40>
A secondary battery was prepared in the same manner as in Sample 15, except that in the preparation of a separator, a 10 wt % solution of polyvinylidene fluoride (PVdF) in N-methyl-2-pyrrolidone was coated on the substrate layer at a rate of 0.1 m/min by a table coater and then dried with hot air without causing phase separation in a water bath, thereby preparing a separator having a surface density of the resin layer of 0.2 mg/cm². In this separator, the air permeability could not be measured because the resin layer thereof did not have porosity and was air-impermeable. That is, this separator was a film which is not microporous, is poor in impregnation properties of the electrolytic solution and does not have ion-permeability, and therefore, it did not function as a battery.

The positive electrode active material and the separator used in each of Sample 1 and Samples 25 to 40 are summarized and shown in the following Tables 4 and 5 along with the results of evaluation of battery characteristics.

TABLE 4

| | Positive electrode active material | | | Separator | | | | |
|---|---|---|---|---|---|---|---|---|
| | Base material | Coating material | Addition amount of coating material [wt %] | Substrate | Thickness of substrate [μm] | Resin layer | Surface density of resin layer [mg/cm$^2$] | Air permeability [sec/100 cc] |
| Sample 1 | LiCoO$_2$ | Li$_2$CO$_3$ + MnCO$_3$ + (NH$_4$)H$_2$PO$_4$ | 2.0 | PP/PE mixture | 7 | PVdF | 0.2 | 250 |
| Sample 25 | LiCoO$_2$ | Li$_2$CO$_3$ + MnCO$_3$ + (NH$_4$)H$_2$PO$_4$ | 2.0 | PP/PE mixture | 5 | PVdF | 0.2 | 210 |
| Sample 26 | LiCoO$_2$ | Li$_2$CO$_3$ + MnCO$_3$ + (NH$_4$)H$_2$PO$_4$ | 2.0 | PP/PE mixture | 9 | PVdF | 0.2 | 290 |
| Sample 27 | LiCoO$_2$ | Li$_2$CO$_3$ + MnCO$_3$ + (NH$_4$)H$_2$PO$_4$ | 2.0 | PP/PE mixture | 12 | PVdF | 0.3 | 390 |
| Sample 28 | LiCoO$_2$ | Li$_2$CO$_3$ + MnCO$_3$ + (NH$_4$)H$_2$PO$_4$ | 2.0 | PP/PE mixture | 20 | PVdF | 0.2 | 600 |
| Sample 29 | LiCoO$_2$ | Li$_2$CO$_3$ + MnCO$_3$ + (NH$_4$)H$_2$PO$_4$ | 2.0 | PP/PE mixture | 7 | PVdF | 0.2 | 600 |
| Sample 30 | LiCoO$_2$ | Li$_2$CO$_3$ + MnCO$_3$ + (NH$_4$)H$_2$PO$_4$ | 2.0 | PE | 7 | PVdF | 0.2 | 320 |
| Sample 31 | LiCoO$_2$ | Li$_2$CO$_3$ + MnCO$_3$ + (NH$_4$)H$_2$PO$_4$ | 2.0 | PP/PE/PP | 7 | PVdF | 0.2 | 250 |
| Sample 32 | LiCoO$_2$ | Li$_2$CO$_3$ + MnCO$_3$ + (NH$_4$)H$_2$PO$_4$ | 2.0 | PP/PE mixture | 7 | PVdF | 0.2 | 250 |
| Sample 33 | LiCoO$_2$ | Li$_2$CO$_3$ + MnCO$_3$ + (NH$_4$)H$_2$PO$_4$ | 2.0 | PP/PE mixture | 7 | PVdF + HFP | 0.2 | 290 |
| Sample 34 | LiCoO$_2$ | Li$_2$CO$_3$ + MnCO$_3$ + (NH$_4$)H$_2$PO$_4$ | 2.0 | PP/PE mixture | 7 | PVdF + Al$_2$O$_3$ | 0.2 | 270 |
| Sample 35 | LiCoO$_2$ | Li$_2$CO$_3$ + MnCO$_3$ + (NH$_4$)H$_2$PO$_4$ | 2.0 | PP/PE mixture | 7 | — | — | 200 |
| Sample 36 | LiCoO$_2$ | Li$_2$CO$_3$ + MnCO$_3$ + (NH$_4$)H$_2$PO$_4$ | 2.0 | PP/PE mixture | 7 | PVdF | 0.6 | 560 |
| Sample 37 | LiCoO$_2$ | Li$_2$CO$_3$ + MnCO$_3$ + (NH$_4$)H$_2$PO$_4$ | 2.0 | PP/PE mixture | 7 | PVdF | 0.2 | 1050 |
| Sample 38 | LiCoO$_2$ | — | — | PP/PE/PP | 7 | PVdF | 0.2 | 250 |
| Sample 39 | LiCoO$_2$ | — | — | PP/PE mixture | 7 | — | — | 200 |
| Sample 40 | LiCoO$_2$ | — | — | PP/PE mixture | 7 | PVdF | 0.2 | Impossible for measurement |

TABLE 5

| | Initial capacity [mAh] | Capacity retention rate [%] | Rate of increase in thickness [%] |
|---|---|---|---|
| Sample 1 | 800 | 75 | 10 |
| Sample 25 | 815 | 69 | 10 |
| Sample 26 | 780 | 72 | 10 |
| Sample 27 | 760 | 59 | 10 |
| Sample 28 | 680 | 26 | 11 |
| Sample 29 | 800 | 51 | 11 |
| Sample 30 | 800 | 62 | 11 |
| Sample 31 | 800 | 79 | 9 |
| Sample 32 | 800 | 71 | 10 |
| Sample 33 | 800 | 65 | 10 |
| Sample 34 | 800 | 67 | 9 |
| Sample 35 | 800 | 13 | 10 |
| Sample 36 | 790 | 22 | 9 |
| Sample 37 | 800 | 20 | 11 |
| Sample 38 | 800 | 57 | 42 |
| Sample 39 | 800 | 5 | 55 |
| Sample 40 | — | — | — |

As is clear from, for example, the comparison of Sample 1 with Sample 35 in Tables 4 and 5, by using the separator having the resin layer provided on the substrate layer, a lowering of the capacity retention rate can be suppressed. It may be considered that this was caused due to the fact that the durability of the separator was enhanced by taking a structure of providing the resin layer. Also, in Sample 28 having a thickness of the substrate layer of 20 μm, the capacity retention rate was lowered as compared with Samples 25 to 27 having a thickness of the substrate layer of not more than 15 μm. Accordingly, it was noted that the thickness of the substrate layer is preferably not more than 15 μm. Also, in Sample 37 having an air permeability exceeding 1,000 sec/100 cc, the capacity retention rate was lowered as compared with Comparative Example 1, and therefore, it was noted that the air permeability is preferably not more than 1,000 sec/100 cc.

Also, it is noted from, for example, Samples 31 and 38 that in the case of using a positive electrode active material not having a coating layer, the capacity retention rate is lowered as compared with the case of using a positive electrode active material having a coating layer and that the rate of increase in thickness increases. However, it was noted from Sample 40 that in the case of using a separator not further having a resin layer, the capacity retention rate is remarkably lowered.

It was noted from the foregoing results that in a high charge state of 4.20 V or more, a lowering of the capacity retention rate can be suppressed by using a separator provided with a resin layer. In particular, it was noted that by using a positive electrode active material including a complex oxide particle containing lithium and cobalt, having provided thereon a coating layer containing at least one element M which is different from the principal transition metal constituting the complex oxide particle and which is selected among elements belonging to the Groups 2 to 13 and an element X which is composed of, for example, phosphorus (P), wherein the element M and the element X show a different distribution state from each other, and using a separator having a resin layer provided therein, it is possible to obtain a secondary battery in which not only a high energy density can be realized, but even when the charge voltage is high, a lowering of the capacity retention rate can be suppressed, and an increase in thickness to be caused due to the gas generation can be suppressed.

While the present application has been described with reference to the embodiments and working examples, it should not be construed that the present application is limited to the foregoing embodiments and working examples, but various modifications can be made. For example, while the secondary battery having a wound structure has been described in the foregoing embodiments and working examples, the present application is also similarly applicable to a secondary battery having a structure in which a positive electrode and a negative electrode are folded or piled up. In addition, the present application is also applicable to a secondary battery of a so-called coin type, button type, rectangular type or laminated film type or the like.

Also, while the secondary battery using a non-aqueous solution or an electrolyte in a gel form as an electrolyte has been described in the foregoing embodiments, the present application is also similarly applicable to a secondary battery using a solid electrolyte. All of an inorganic solid electrode and a polymer solid electrolyte can be used as the solid electrolyte so far as they have lithium ion conductivity.

Examples of the inorganic solid electrolyte include lithium nitride and lithium iodide. The polymer solid electrolyte is composed of an electrolyte salt and a polymer compound capable of dissolving it therein. As the polymer compound, ether based polymers such as poly(ethylene oxide) and crosslinked materials thereof, poly(methacrylate) ester based polymers, acrylate based polymers and the like can be used singly or upon copolymerization in a molecule or mixing.

Furthermore, while the so-called lithium ion secondary battery in which the capacity of a negative electrode is expressed by a capacity component due to intercalation and deintercalation of lithium has been described in the foregoing embodiments and working examples, the present application is also similarly applicable to a so called lithium metal secondary battery in which the capacity of a negative electrode is expressed by a capacity component due to deposition and dissolution of lithium or a secondary battery in which by making the charge capacity of a negative electrode material capable of intercalating and deintercalating lithium smaller than that of a positive electrode, the capacity of a negative electrode is expressed by the sum including a capacity component due to intercalation and deintercalation of lithium and a capacity component due to deposition and dissolution of lithium.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A positive electrode active material comprising:
a complex oxide particle containing at least lithium and one or more transition metals;
and a coating layer provided in at least a part of the complex oxide particle, wherein:
the coating layer contains at least one element M selected among elements belonging to Groups 2 to 13, and at least one element X selected among phosphorus (P), silicon (Si) and germanium (Ge), and
the element M is uniformly distributed on the surface of the complex oxide particle, and the element X is interspersed on the surface of the complex oxide particle.

2. The positive electrode active material according to claim 1, wherein the coating layer contains, as a first element the element M and further contains, as a second element, an element M2 selected among elements belonging to Groups 2 to 13, the element M and the element M2 are different from each other, and the element M2 is unevenly distributed or interspersed on the surface of the complex oxide particle.

3. The positive electrode active material according to claim 2, wherein the element M2 is at least one member among magnesium (Mg), zinc (Zn) and iron (Fe).

4. The positive electrode active material according to claim 1, wherein at least a part of the element X exists in a state of a compound represented by $M'X_bO_c$.

5. The positive electrode active material according to claim 4, wherein the element M and the element M' constituting the compound represented by $M'_aX_bO_c$ are different elements.

6. The positive electrode active material according to claim 4, wherein the compound represented by $M'_aX_bO_c$ is crystalline.

7. The positive electrode active material according to claim 4, wherein the compound represented by $M'_aX_bO_c$ contains at least $Li_3PO_4$.

8. The positive electrode active material according to claim 1, wherein the complex oxide particle has a layered rock salt structure.

9. The positive electrode active material according to claim 1, wherein the complex oxide particle contains cobalt (Co).

10. The positive electrode active material according to claim 9, wherein in the positive electrode active material including the complex oxide particle and the coating layer, an element composition of the element M and the element X contained in the whole of the positive electrode active material is satisfied with a relation of $0<(M+X)/(Co+M+X)<0.25$.

11. The positive electrode active material according to claim 9, wherein the element M contained in the coating layer contains at least manganese (Mn), and in the positive electrode active material including the complex oxide particle and the coating layer, an element composition of manganese (Mn) contained in the complex oxide particle and the element M contained in the coating layer is satisfied with a relation of $0<(Mn+M)/(Co+Mn+M)<0.1$.

12. The positive electrode active material according to claim 1, wherein at least one of the complex oxide particle and the coating layer contains cobalt (Co), and an element composition on the surface of the positive electrode active material including the complex oxide particle and the coating layer is a satisfied with a relation of $Co/(Co+M+X)<0.7$.

13. A positive electrode comprising:
a conductive substrate; and
a positive electrode active material layer provided on the conductive substrate and containing at least a positive electrode active material, wherein
the positive electrode active material includes
a complex oxide particle containing at least lithium and one or plural transition metals; and
a coating layer provided in at least a part of the complex oxide particle, and wherein:
the coating layer contains at least one element M selected among elements belonging to Groups 2 to 13, and at least one element X selected among phosphorus (P), silicon (Si) and germanium (Ge), and
the element M is uniformly distributed on the surface of the complex oxide particle, and the element X is interspersed on the surface of the complex oxide particle.

14. A non-aqueous electrolyte secondary battery comprising:
a positive electrode having a positive electrode active material;
a negative electrode;
a separator; and
an electrolyte, wherein
the positive electrode active material includes
a complex oxide particle containing at least lithium and one or plural transition metals; and
a coating layer provided in at least a part of the complex oxide particle, and wherein:
the coating layer contains at least one element M selected among elements belonging to Groups 2 to 13, and at least one element X selected among phosphorus (P), silicon (Si) and germanium (Ge), and
the element M is uniformly distributed on the surface of the complex oxide particle, and the element X is interspersed on the surface of the complex oxide particle.

15. The non-aqueous electrolyte secondary battery according to claim 14, wherein sulfur (S) exists on at least one of the surface of the positive electrode active material and the surface of the positive electrode.

16. The non-aqueous electrolyte secondary battery according to claim 15, wherein a 2p spectrum of the sulfur (S) lies in a region of 165 eV or more and not more than 170 eV.

17. The non-aqueous electrolyte secondary battery according to claim 14, wherein the separator has a substrate layer made of a microporous film containing at least one member selected among polyethylene, polypropylene, copolymers thereof and polyolefins obtained by combining these polymers, and a resin layer provided on at least one surface of the substrate layer.

18. The non-aqueous electrolyte secondary battery according to claim 17, wherein at least a part of the resin layer contains at least one member selected among polyvinylidene fluoride (PVdF), vinylidene fluoride-hexafluoropropylene copolymer and polytetrafluoroethylene (PTFE).

19. The non-aqueous electrolyte secondary battery according to claim 17, wherein the separator has an air permeability of 30 sec/100 cc or more and not more than 1,000 sec/100 cc.

20. The non-aqueous electrolyte secondary battery according to claim 17, wherein the separator has a weight per unit area of the resin layer of from 0.05 mg/cm$^2$ to 0.5 mg/cm$^2$ per one surface.

21. The non-aqueous electrolyte secondary battery according to claim 17, wherein the substrate layer of the separator has a thickness of 5 μm or more and not more than 15 μm.

22. The non-aqueous electrolyte secondary battery according to claim 14, wherein an upper limit charge voltage is 4.25 V or more and not more than 4.80 V, and a lower limit discharge voltage is 2.00 V or more and not more than 3.30 V.

* * * * *